(12) United States Patent
Ayres et al.

(10) Patent No.: US 8,446,808 B2
(45) Date of Patent: May 21, 2013

(54) USE OF FEEDBACK ERROR AND/OR FEED-FORWARD SIGNALS TO ADJUST CONTROL AXES TO OPTIMAL RECOVERY POSITION OF HOLOGRAM IN HOLOGRAPHIC DATA STORAGE SYSTEM OR DEVICE

(75) Inventors: Mark R. Ayres, Boulder, CO (US); Alan Hoskins, Golden, CO (US); Paul C. Smith, Louisville, CO (US); John J. Kane, Westminster, CO (US)

(73) Assignee: Akonia Holographics, LLC, Longmont, CO (US)

( * ) Notice: Subject to any disclaimer, the term of this patent is extended or adjusted under 35 U.S.C. 154(b) by 152 days.

(21) Appl. No.: 12/351,047

(22) Filed: Jan. 9, 2009

(65) Prior Publication Data

US 2009/0207710 A1    Aug. 20, 2009

Related U.S. Application Data

(60) Provisional application No. 61/028,628, filed on Feb. 14, 2008.

(51) Int. Cl.
   *G11B 7/00* (2006.01)
(52) U.S. Cl.
   USPC .................. 369/103; 369/44.32; 369/44.13
(58) Field of Classification Search .................. None
   See application file for complete search history.

(56) References Cited

U.S. PATENT DOCUMENTS

| | | | |
|---|---|---|---|
| 5,838,650 A | 11/1998 | Campbell et al. | |
| 5,920,536 A | 7/1999 | Campbell et al. | |
| 5,982,513 A | 11/1999 | Zhou et al. | |
| 6,103,454 A | 8/2000 | Dhar et al. | |
| 6,156,425 A | 12/2000 | Bouquerel et al. | |
| 6,191,875 B1 | 2/2001 | Curtis et al. | |
| 6,414,296 B1 | 7/2002 | Edwards | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,765,061 B2 | 7/2004 | Dhar et al. | |
| 6,780,546 B2 | 8/2004 | Trentler et al. | |
| 6,882,601 B2 | 4/2005 | Kadlec et al. | |
| 6,898,164 B2 | 5/2005 | Kadlec et al. | |
| 6,970,403 B2 | 11/2005 | Kadlec et al. | |

(Continued)

OTHER PUBLICATIONS

Psaltis et al., "Holographic Storage Using Shift Multiplexing," Optic Letters 20(7): pp. 782-784 (Apr. 1, 1995).
Horimai et al., "Collinear Holography," Applied Optics 44(13): pp. 2575-2579 (May 2005).
Ayres et al., "Image Oversampling for Holographic Data Storage," Applied Optics 45(11): pp. 2459-2464 (2005).

(Continued)

*Primary Examiner* — Muhammad N Edun
(74) *Attorney, Agent, or Firm* — Morrison & Foerster LLP

(57) ABSTRACT

A method for adjusting at least one alignment control axis of a holographic data storage system or device to or towards a sufficiently optimal recovery position for recovery of a hologram based on a derived feedback error signal and/or a derived feed-forward signal. For the next hologram in the sequence, the derived feedback error signal estimates the direction and magnitude of misalignment of the at least one alignment control axis for one or more previously recovered holograms based on alignment-indicating data. The derived feed-forward signal estimates an optimal alignment value for the at least one alignment control axis for one or more holograms based on recording and recovery operating condition data for the holograms. An iterative alignment procedure may also be used to derive a feedback error signal for one hologram.

66 Claims, 21 Drawing Sheets

U.S. PATENT DOCUMENTS

| | | | |
|---|---|---|---|
| 6,970,410 | B2 | 11/2005 | Kadlec et al. |
| 7,016,280 | B2 | 3/2006 | Kadlec |
| 7,020,054 | B2 | 3/2006 | Kadlec et al. |
| 7,023,776 | B2 | 4/2006 | Kadlec et al. |
| 7,092,322 | B2 | 8/2006 | Kadlec et al. |
| 7,113,464 | B2 * | 9/2006 | Roh et al. .................... 369/53.19 |
| 7,116,626 | B1 * | 10/2006 | Woods et al. ................. 369/103 |
| 7,173,744 | B1 | 2/2007 | Whiteside et al. |
| 7,184,383 | B2 | 2/2007 | Ayres et al. |
| 7,336,577 | B2 | 2/2008 | Roh et al. |
| 7,414,940 | B2 | 8/2008 | Kadlec et al. |
| 7,580,433 | B2 * | 8/2009 | Tanaka et al. .................... 372/34 |
| 2003/0206320 | A1 | 11/2003 | Cole et al. |
| 2004/0027625 | A1 | 2/2004 | Trentler et al. |
| 2004/0179251 | A1 | 9/2004 | Anderson et al. |
| 2005/0036182 | A1 | 2/2005 | Curtis et al. |
| 2005/0286388 | A1 * | 12/2005 | Ayres et al. .................... 369/103 |
| 2007/0211321 | A1 * | 9/2007 | Hoskins et al. ................. 359/24 |

OTHER PUBLICATIONS

Mok, "Angle-Multiplexed Storage of 5000 Holograms in Lithium Niobate," Optic Letters 18(11): pp. 915-917 (Jun. 1, 1993).

Curtis et al., "Cross Talk for Angle- and Wavelength-Multiplexed Image Plane Holograms," Optic Letters 19(21): pp. 1774-1776 (Nov. 1, 1994).

Dorf, "Modern Control Systems," Third Edition, Addison-Wesley Publishing (May 1981).

Marchant, "Optical Recording: A Technical Overview," Addison-Wesley Publishing, pp. 180-181 (1990).

Kay, "Fundamentals of Statistical Signal Processing: Estimation Theory, Chapter 8," Prentice Hall PTR, pp. 219-288 (1993).

Ayres et al., "Signal Modulation for Holographic Memories," Dissertation, (2007).

Hoskins et al., "Temperature Compensation Strategy for Holographic Storage," ODS Presentation (Apr. 26, 2006).

* cited by examiner

USE OF FEEDBACK ERROR AND/OR FEED-FORWARD SIGNALS TO ADJUST CONTROL AXES TO OPTIMAL RECOVERY POSITION OF HOLOGRAM IN HOLOGRAPHIC DATA STORAGE SYSTEM OR DEVICE

CROSS-REFERENCE TO RELATED APPLICATIONS

This application claims the priority of U.S. Provisional patent Application No. 61/028,628 entitled "SERVO FOR HOLOGRAPHIC DATA STORAGE" filed Feb. 14, 2008, the entire disclosure and contents of which is hereby incorporated by reference. This application also makes reference to the following U.S. patent application Ser. No. 12/266,637 entitled "REPLACEMENT AND ALIGNMENT OF LASER" filed Nov. 7, 2008, which is a division of U.S. patent application Ser. No. 11/440,368, filed May 25, 2006; U.S. Provisional Patent Application No. 61/098,445 entitled "METHOD FOR FINDING AND TRACKING SINGLE MODE OPERATION POINT OF AN EXTERNAL CAVITY DIODE LASER" filed Sep. 19, 2008; U.S. Provisional Patent Application No. 60/980,604 entitled "LAYOUT METHOD FOR MULTIPLEXED HOLOGRAMS" filed Oct. 17, 2007; U.S. patent application Ser. No. 12/210,476, entitled "LAYOUT METHOD FOR MULTIPLEXED HOLOGRAMS" filed Sep. 15, 2008; U.S. Provisional Patent Application No. 61/083,254, entitled "METHOD ALLOWING LOCALIZED GATING OF DIFFUSION PROPERTIES," filed Jul. 24, 2008; U.S. Provisional Patent Application No. 61/082,328, entitled "METHOD TO MODIFY AND APPLY EDGE SEAL MATERIALS TO LAMINATED MEDIA SO THAT THE RESULTING SEAL HAS MINIMAL EFFECT ON THE SHAPE OF THE MEDIA AFTER EXPOSURE TO ELEVATED TEMPERATURES," filed Jul. 21, 2008; U.S. Provisional Patent Application No. 61/060,890, entitled "SYSTEM AND DEVICES FOR IMPROVING EXTERNAL CAVITY DIODE LASERS USING WAVELENGTH AND MODE SENSORS AND COMPACT OPTICAL PATHS," filed Jun. 12, 2008; U.S. Provisional Patent Application No. 61/054,613, entitled "METHOD FOR COMPENSATING FOR THERMAL EFFECTS OF A PHOTOPOLYMER BY USING ADAPTIVE ENERGY CONTROL," filed May 20, 2008; U.S. Provisional Patent Application No. 60/980,604 entitled "LAYOUT METHOD FOR MULTIPLEXED HOLOGRAMS" filed Oct. 17, 2007; U.S. Provisional Patent Application No. 60/855,754, entitled "EMULATION OF DISSIMILAR REMOVABLE MEDIUM STORAGE DEVICE TYPES ASSISTED BY INFORMATION EMBEDDED IN THE LOGICAL FORMAT," filed Sep. 1, 2006; U.S. patent application Ser. No. 11/849,658, entitled "EMULATION OF DISSIMILAR REMOVABLE MEDIUM STORAGE DEVICE TYPES ASSISTED BY INFORMATION EMBEDDED IN THE LOGICAL FORMAT," filed Sep. 4, 2007; U.S. Provisional Patent Application No. 60/831,692, entitled "EXTERNAL CAVITY DIODE LASER COLLIMATION GROUP ADJUSTMENT" filed Jul. 19, 2006; U.S. patent application Ser. No. 11/826,517, entitled "COLLIMATION LENS GROUP ADJUSTMENT FOR LASER SYSTEM" filed Jul. 16, 2007; U.S. Provisional Patent Application No. 60/802,530, entitled "HIGH-SPEED ELECTROMECHANICAL SHUTTER" filed May 25, 2006; U.S. patent application Ser. No. 11/752,804, entitled "HIGH-SPEED ELECTROMECHANICAL SHUTTER" filed May 25, 2007; U.S. Provisional Patent Application No. 60/793,322, entitled "METHOD FOR DESIGNING INDEX CONTRASTING MONOMERS" filed Apr. 20, 2006; U.S. Provisional patent application Ser. No. 11/738,394, entitled "INDEX CONTRASTING-PHOTOACTIVE POLYMERIZABLE MATERIALS, AND ARTICLES AND METHODS USING SAME" filed Apr. 20, 2007; U.S. Provisional Patent Application No. 60/780,354, entitled "EXTERNAL CAVITY LASER" filed Mar. 9, 2006; U.S. patent application Ser. No. 11/716,002, entitled "EXTERNAL CAVITY LASER" filed Mar. 9, 2007; U.S. Provisional Patent Application No. 60/779,444, entitled "METHOD FOR DETERMINING MEDIA ORIENTATION AND REQUIRED TEMPERATURE COMPENSATION IN PAGE-BASED HOLOGRAPHIC DATA STORAGE SYSTEMS USING DATA PAGE BRAGG DETUNING MEASUREMENTS" filed Mar. 7, 2006; U.S. patent application Ser. No. 11/714,125, entitled "METHOD FOR DETERMINING MEDIA ORIENTATION AND REQUIRED TEMPERATURE COMPENSATION IN PAGE-BASED HOLOGRAPHIC DATA STORAGE SYSTEMS USING DATA PAGE BRAGG DETUNING MEASUREMENTS" filed Mar. 6, 2007; U.S. Provisional Patent Application No. 60/778,935, entitled "MINIATURE FLEXURE BASED SCANNERS FOR ANGLE MULTIPLEXING" filed Mar. 6, 2006; U.S. Provisional Patent Application No. 60/780,848, entitled "MINIATURE FLEXURE BASED SCANNERS FOR ANGLE MULTIPLEXING" filed Mar. 10, 2006; U.S. Provisional Patent Application No. 60/756,556, entitled "EXTERNAL CAVITY LASER WITH A TUNABLE HOLOGRAPHIC ELEMENT" filed Jan. 6, 2006; U.S. patent application Ser. No. 11/649,801, entitled "An EXTERNAL CAVITY LASER WITH A TUNABLE HOLOGRAPHIC ELEMENT" filed Jan. 5, 2007; U.S. Provisional Patent Application No. 60/738,597, entitled "METHOD FOR HOLOGRAPHIC DATA RETRIEVAL BY QUADRATURE HOMODYNE DETECTION" filed Nov. 22, 2005; U.S. patent application Ser. No. 11/562,533, entitled "METHOD FOR HOLOGRAPHIC DATA RETRIEVAL BY QUADRATURE HOMODYNE DETECTION" filed Nov. 22, 2006; U.S. patent application Ser. No. 11/402,837, entitled "ARTICLE COMPRISING HOLOGRAPHIC MEDIUM BETWEEN SUBSTRATES HAVING ENVIRONMENTAL BARRIER SEAL AND PROCESS FOR PREPARING SAM" filed Dec. 2, 2005; U.S. patent application Ser. No. 11/291,845, entitled "ARTICLE COMPRISING HOLOGRAPHIC MEDIUM BETWEEN SUBSTRATES HAVING ENVIRONMENTAL BARRIER SEAL AND PROCESS FOR PREPARING SAM" filed Dec. 2, 2005, now U.S. Pat. No. 7,173,744, issued Feb. 6, 2007; U.S. Provisional Patent Application No. 60/728,768, entitled "METHOD AND SYSTEM FOR INCREASING HOLOGRAPHIC DATA STORAGE CAPACITY USING IRRADIANCE-TAILORING ELEMENT" filed Oct. 21, 2005; U.S. patent application Ser. No. 11/319,425, entitled "METHOD AND SYSTEM FOR INCREASING HOLOGRAPHIC DATA STORAGE CAPACITY USING IRRADIANCE-TAILORING ELEMENT" filed Dec. 27, 2005; U.S. Provisional Application No. 60/684,531, entitled "METHODS FOR MAKING A HOLOGRAPHIC STORAGE DRIVE SMALLER, CHEAPER, MORE ROBUST AND WITH IMPROVED PERFORMANCE" filed May 26, 2005; U.S. patent application Ser. No. 11/440,368, entitled "REPLACEMENT AND ALIGNMENT OF LASER" filed May 25, 2006, now U.S. Pat. No. 7,466,411, issued Dec. 16, 2008; U.S. patent application Ser. No. 11/440,369, entitled "HOLOGRAPHIC DRIVE HEAD ALIGNMENTS" filed May 25, 2006; U.S. patent application Ser. No. 11/440,365, entitled "LASER MODE STABILIZATION USING AN ETALON" filed May 25, 2006; U.S. patent application Ser.

No. 11/440,366, entitled "ERASING HOLOGRAPHIC MEDIA" filed May 25, 2006; U.S. patent application Ser. No. 11/440,367, entitled "POST-CURING OF HOLOGRAPHIC MEDIA" filed May 25, 2006; U.S. patent application Ser. No. 11/440,371, entitled "SENSING ANGULAR ORIENTATION OF HOLOGRAPHIC MEDIA IN A HOLOGRAPHIC MEMORY SYSTEM" filed May 25, 2006; U.S. patent application Ser. No. 11/440,372, entitled "SENSING ABSOLUTE POSITION OF AN ENCODED OBJECT" filed May 25, 2006; U.S. patent application Ser. No. 11/440,357, entitled "CONTROLLING THE TRANSMISSION AMPLITUDE PROFILE OF A COHERENT LIGHT BEAM IN A HOLOGRAPHIC MEMORY SYSTEM" filed May 25, 2006; U.S. patent application Ser. No. 11/440,358, entitled "OPTICAL DELAY LINE IN HOLOGRAPHIC DRIVE" filed May 25, 2006; U.S. patent application Ser. No. 11/440,359, entitled "HOLOGRAPHIC DRIVE HEAD AND COMPONENT ALIGNMENT" filed May 25, 2006; U.S. patent application Ser. No. 11/440,448, entitled "IMPROVED OPERATIONAL MODE PERFORMANCE OF A HOLOGRAPHIC MEMORY SYSTEM" filed May 25, 2006, now U.S. Pat. No. 7,480,085, issuing Jan. 20, 2009; U.S. patent application Ser. No. 11/440,447, entitled "PHASE CONJUGATE RECONSTRUCTION OF A HOLOGRAM" filed May 25, 2006; U.S. patent application Ser. No. 11/440,446, entitled "METHODS AND SYSTEMS FOR LASER MODE STABILIZATION" filed May 25, 2006, now U.S. Pat. No. 7,397,571, issued Jul. 8, 2008; U.S. patent application Ser. No. 11/440,370, entitled "METHODS FOR MAKING A HOLOGRAPHIC STORAGE DRIVE SMALLER, CHEAPER, MORE ROBUST AND WITH IMPROVED PERFORMANCE" filed May 25, 2006; U.S. patent application Ser. No. 11/447,033, entitled "LOADING AND UNLOADING MECHANISM FOR DATA STORAGE CARTRIDGE AND DATA DRIVE" filed Jun. 6, 2006; U.S. patent application Ser. No. 11/283,864, entitled "DATA STORAGE CARTRIDGE LOADING AND UNLOADING MECHANISM, DRIVE DOOR MECHANISM AND DATA DRIVE" filed Nov. 22, 2006; U.S. patent application Ser. No. 11/237,883, entitled "HOLOGRAPHIC RECORDING MEDIUM AND SUBSTRATE WITH CTE COMPENSATING INTERFACE THEREBETWEEN" filed Sep. 29, 2005; U.S. patent application Ser. No. 11/261,840, entitled "SHORT STACK RECORDING IN HOLOGRAPHIC MEMORY SYSTEMS" filed Dec. 2, 2005; U.S. patent application Ser. No. 11/067,010, entitled "HIGH FIDELITY HOLOGRAM DEVELOPMENT VIA CONTROLLED POLYMERIZATION" filed Feb. 28, 2005; U.S. Provisional Patent Application No. 60/576,381, entitled "METHOD FOR ORGANIZING AND PROTECTING DATA STORED ON HOLOGRAPHIC MEDIA BY USING ERROR CONTROL AND CORRECTION TECHNIQUES AND NEW DATA ORGANIZATION STRUCTURES" filed Jun. 3, 2004; U.S. patent application Ser. No. 11/139,806, entitled "DATA PROTECTION SYSTEM" filed May 31, 2005; U.S. patent application Ser. No. 11/140,151, entitled "MULTI-LEVEL FORMAT FOR INFORMATION STORAGE" filed May 31, 2005; and U.S. patent application Ser. No. 10/866,823, entitled "THERMOPLASTIC HOLOGRAPHIC MEDIA" filed Jun. 15, 2004. The entire disclosure and contents of the above applications are hereby incorporated by reference.

FIELD OF THE INVENTION

The present invention broadly relates to methods for adjusting at least one alignment control axis of a holographic data storage system or device to or towards a sufficiently optimal recovery position for recovery of the next hologram in a sequence of holograms by the holographic data storage system or device based on a derived feedback error signal and/or a derived feed-forward signal. The present invention further broadly relates to a method using a feedback error signal derived by an iterative alignment procedure for one hologram for adjusting at least one alignment control axis of a holographic data storage system or device to or towards a sufficiently optimal recovery position for recovery of the one hologram by the holographic data storage system or device.

BACKGROUND

In a holographic data storage (HDS) device or system, data-bearing holograms are recorded in a photosensitive holographic storage medium. The data in a hologram may be recovered by illuminating the holographic storage medium with a probe beam (also referred to as a recovery or reconstruction beam), which is nominally a replica of the reference beam used to record (write) the hologram. The probe beam is diffracted by the recorded hologram, thereby generating a diffracted beam, which is a replica of the original data-bearing signal beam. The diffracted beam may then be detected with a detector array, such as a camera, and the data recovered from the resulting detected holographic image.

The quality of the diffracted beam often depends on the precise alignment of the probe beam wavefront to the holographic fringes within the hologram. High storage capacity may be achieved by densely multiplexing many holograms within a medium. An HDS device or system often employs one or more multiplexing methods, each of which may require one or more control signals to select the desired hologram to be recovered. The HDS device or system may, for example, use a galvanometer in order to control the probe beam angle of incidence to effect angle multiplexing, and translation plus rotation (r, θ) actuators in order to properly position the disk-shaped medium with respect to the probe beam and recovery optics (spatial multiplexing). See Mok, "Angle-Multiplexed Storage of 5000 Holograms in Lithium Niobate," *Opt. Lett.* 18:915-917 (1993). Other control signals may be used to adjust other alignment parameters not associated with multiplexing per se.

A variety of methods have been used to try to align a probe beam with respect to the hologram(s) to be recovered from the holographic storage medium. The simplest method, which may be adequate in some cases, is to simply apply an open-loop control signal. In other cases, an actuator which may contain an integrated feedback sensor, such as a linear or angular position encoder, may be used to try to position the probe beam and/or holographic storage medium properly with respect to the hologram(s) to be recovered. Servo marks may also be pre-formatted onto the holographic storage medium in order to provide positioning feedback. See U.S. Pat. No. 7,184,383 (Ayres et. al.), issed Feb. 27, 2007; Horimai et al., "Collinear Holography," *Appl. Opt.* 44:2575-2579 (2005). Methods involving wavelength and temperature tuning have also been used. See U.S. Pat. Appln. No. 2007/0211321 (Hoskins et al.), published Sep. 13, 2007.

SUMMARY

According to a first broad aspect of the present invention, there is provided a method comprising the following steps:
  (a) in a holographic data storage system or device, providing a sequence of recorded holograms including a next hologram in the sequence to be recovered; and (b) adjusting at least one alignment control axis of the holographic data storage system or device to or towards a sufficiently optimal recovery position for recovery of the next hologram by the holographic data storage system or device based one or both of a derived feedback error signal and a derived feed-forward signal;
wherein the derived feedback error signal estimates a direction and magnitude of misalignment of the at least one alignment control axis for one or more previously recovered holograms based on alignment-indicating data for the one or more previously recovered holograms; and
wherein the derived feed-forward signal estimates an optimal alignment value for the at least one alignment control axis for one or more holograms in the sequence based on recording and recovery operating condition data for the one or more holograms in the sequence.

According to a second broad aspect of the present invention, there is provided a method comprising the following steps:
(a) in a holographic data storage system or device, providing a sequence of recorded holograms including one or more previously recovered holograms and a next hologram in the sequence to be recovered;
(b) based on alignment-indicating data for the one or more previously recovered holograms, deriving a feedback error signal which estimates a direction and magnitude of misalignment of at least one alignment control axis for the one or more previously recovered holograms;
(c) based on recording and recovery operating condition data for one or more holograms in the sequence, deriving a feed-forward signal which estimates an optimal alignment value for the at least one alignment control axis for the one or more holograms in the sequence; and
(d) adjusting the at least one alignment control axis of the holographic data storage system or device to or towards a sufficiently optimal recovery position for recovery of the next hologram by the holographic data storage system or device based on the derived feedback error signal of step (b) and the derived feed-forward signal of step (c).

According to a third broad aspect of the present invention, there is provided a method comprising the following steps:
(a) in a holographic data storage system or device, providing a hologram to be recovered; and
(b) adjusting at least one alignment control axis of the holographic data storage system or device to or towards a sufficiently optimal recovery position for recovery of the hologram by the holographic data storage system or device based on a feedback error signal for the hologram;
wherein the feedback error signal for the hologram is derived by an iterative alignment procedure comprising: (i) providing at least one alignment control axis having a starting position; (ii) providing alignment-indicating data for the at least one alignment control axis; (iii) determining from the alignment-indicating data an alignment value for the at least one alignment control axis; and (iv) based on the alignment value determined in step (iii), determining whether to adjust the at least one alignment control axis from the starting position to a new position and repeating steps (ii) through (iii), or whether the at least one at least one control axis is at the sufficiently optimal recovery position, thereby terminating the iterative alignment procedure.

BRIEF DESCRIPTION OF THE DRAWINGS

The invention will be described in conjunction with the accompanying drawings, in which.

DETAILED DESCRIPTION

Figure 1:
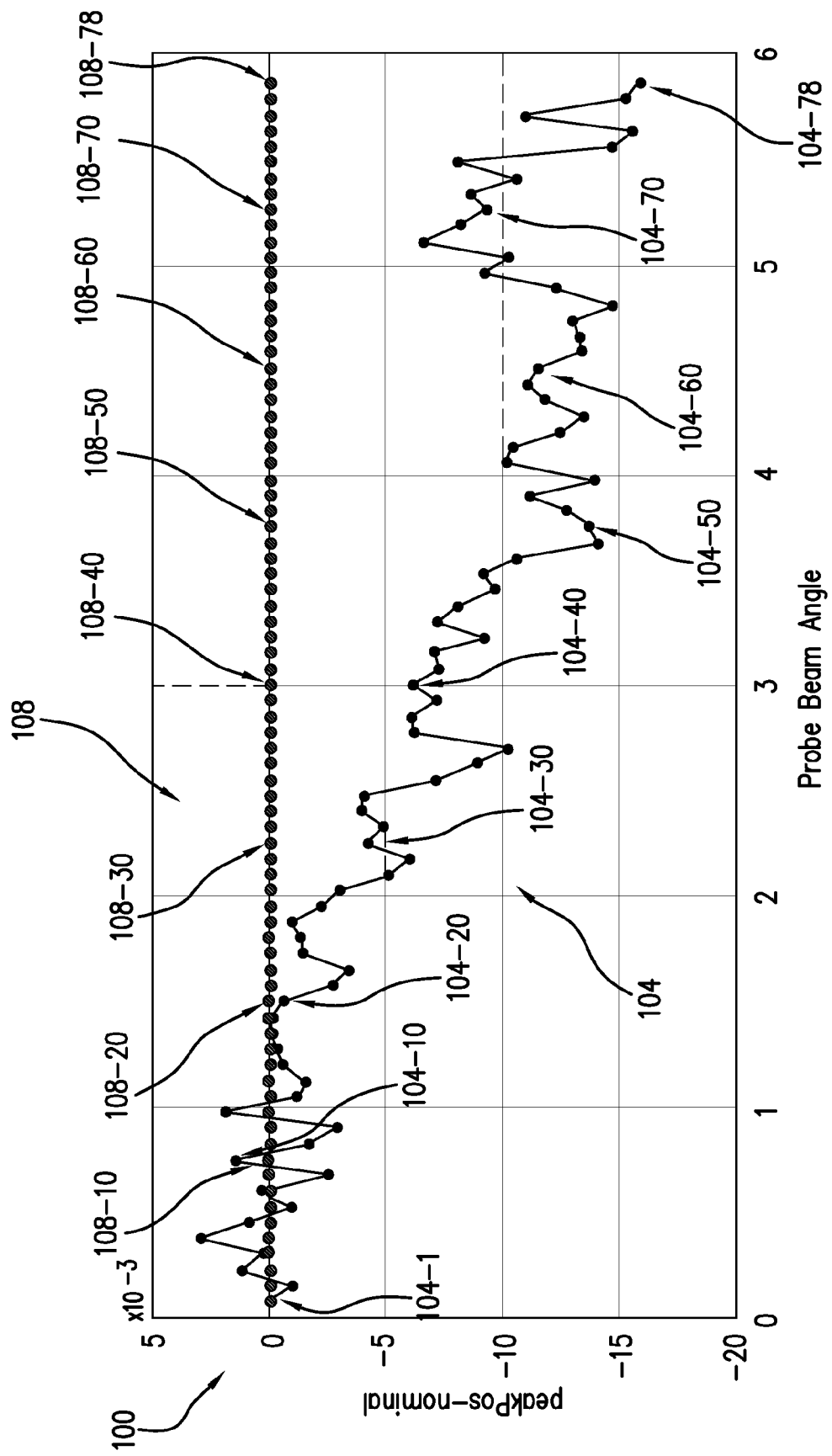
FIG. 1 is a graphical plot of 78 holograms which are recorded by angle multiplexing in a specific volume of a holographic storage medium by varying the reference beam angle from 0.075° to 5.85° in 0.075° increments during recording of the holograms, and showing the displacement of the optimal recovery angles, relative to the original recording angles.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, directional terms such as "top", "bottom", "above", "below", "left", "right", "horizontal", "vertical", "up", "down", etc. are merely used for convenience in describing the various embodiments of the present invention. The embodiments of the present invention may be oriented in various ways. For example, the diagrams, graphs, axes, etc., shown in FIGS. 1 through 22 may be flipped over, rotated by 90° in any direction, reversed, etc.

For the purposes of the present invention, the term "coherent light beam" refers to a beam of light including waves with a particular (e.g., constant) phase relationship, such as, for example, a laser beam.

For the purposes of the present invention, the terms "data beam" and "signal beam" refer interchangeably to a beam containing a data signal. For example, a signal beam may include beams that have been modulated by a modulator such as a spatial light modulator (SLM), along with a beam generated in response to a reference beam impingent on a holographic storage medium, where the generated beam includes data. The modulation of the signal beam may be an amplitude, a phase or some combination of the amplitude and phase. The SLM may be reflective or transmissive. The signal beam may be modulated into a binary state or into a plurality of states. The signal beam may include data as well as headers that contain information about the data to be stored or where the data is stored. The signal beam may also include known bits for a servo or to detect the location of the data once it is detected by or on a detector such as, for example, a CMOS sensor array.

For the purposes of the present invention, the term "data modulated beam" refers to a signal beam that has been modulated by a modulator such as a spatial light modulator (SLM). The modulation of the signal beam may be an amplitude, a phase or some combination of the amplitude and phase. The SLM may be reflective or transmissive. The signal beam may be modulated into a binary state or into a plurality of states.

For the purposes of the present invention, the term "data modulator" refers to any device that is capable of optically representing data in a single bit or in one or two-dimensions from a signal beam.

For the purposes of the present invention, the term "holographic data" refers to data recorded, stored, written, etc., in the holographic storage medium as one or more holograms.

For the purposes of the present invention, the term "data page" or "page" refers to the conventional meaning of data page as used with respect to holography. For example, a data page may be a page of data (i.e., a two-dimensional assembly of data), one or more pictures, etc., to be written or written in a holographic storage medium. The data page may include header information and known bits for servo and channel usage, as well as bits that represent the data to be stored or processed.

For the purposes of the present invention, the term "disk" refers to a disk-shaped (i.e., generally circular-shaped) holographic storage medium.

For the purposes of the present invention, the terms "holograph" or "hologram" (collectively and interchangeably referred to hereafter as "hologram") are used in the conventional sense of referring to an interference pattern formed when a signal beam and a reference beam interfere with each other. In cases where digital data is recorded page-wise, the signal beam may be encoded with a data modulator, e.g., a spatial light modulator, etc.

For the purposes of the present invention, the term "holographic grating" refers to a component of a hologram, e.g. an individual sinusoidal grating.

For the purposes of the present invention, the term "storage medium" refers to any component, material, etc., capable of storing information, such as, for example, a holographic storage medium.

For the purposes of the present invention, the term "holographic storage medium" refers to medium that has a least one component, material, layer, etc., that is capable of recording, storing, writing, etc., one or more holograms (e.g., bit-wise, linear array-wise or page-wise) as one or more patterns of varying refractive index imprinted into the medium. Examples of a holographic storage medium useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003/0206320 (Cole et al.) published Nov. 6, 2003; and U.S. Patent Application No. 2004/0027625 (Trentler et al.), published Feb. 12, 2004, the entire disclosure and contents of which are herein incorporated by reference. The holographic storage medium may comprise photopolymers, photo-chromatic materials, photo-refractive materials, etc. The holographic storage medium may be any type, including: a transparent holographic storage medium, a holographic storage medium including a plurality of components or layers such as a reflective layer, a holographic storage medium including a reflective layer and a polarizing layer so reflection may be controlled with polarization, a holographic storage medium including variable beam transmission layer that may be pass, absorb, reflect, be transparent to, etc., light beams, grating layers for reflecting light beams, substrates, substrates with servo markings, etc. The storage medium may be highly transmissively flat (thus making multiplexing easier and better) or not flat. An example of an inexpensive flat storage medium (e.g., to better than a couple wavelengths within the area where data may be stored) may use what is referred to herein as the Zerowave™ process, which is described in U.S. Pat. No. 6,156,425 (Bouquerel et al.), issued Dec. 5, 2000, the entire disclosure and contents of which is hereby incorporated by reference. All holographic storage medium described herein may be, for example, in the shape, form, etc., of a disk, card, flexible tape media, etc.

For the purposes of the present invention, the term "holographic recording" refers to the act of recording, storing, writing, etc., a hologram in a holographic storage medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For the purposes of the present invention, the terms "recording," "storing," and "writing (collectively and interchangeably referred to hereafter as "recording") refer to recording, storing or writing holograms to and/or into a holographic storage medium.

For the purposes of the present invention, the term "recording light" refers to a light source used to write holograms to a holographic storage medium.

For the purposes of the present invention, the term "reference beam" refers to a beam of light not modulated with recording data. Exemplary reference beams may include non-data bearing laser beams used while recording or writing holograms to, or reading or recovering holograms from, a holographic storage medium. In some embodiments, the reference beam may refer to the original reference beam used to write the hologram, to a reconstruction beam when used to recover holograms from the holographic storage medium, or to a phase conjugate of the original reference (reconstruction) beam. When recovering holograms, the reference beam may also be referred to interchangeably as a "probe beam."

For the purposes of the present invention, the term "multiplexing" refers to recording (writing) a plurality of holograms in the same volume or nearly the same volume of the holographic storage medium by varying a recording (writing) parameter(s) including, but not limited to, angle, wavelength, phase code, polytopic, shift, correlation, peristrophic, fractal, etc., including combinations of parameters, e.g. angle-polytopic multiplexing. For example, angle multiplexing involves varying the angle of the plane wave or nearly plane wave of the reference beam during recording (writing) to store a plurality of holograms in the same volume. The multiplexed holograms that are recorded (written) may be recovered by using/changing the same writing parameter(s) used to record (write) the respective holograms.

For the purposes of the present invention, the term "polytopic multiplexing" refers to a multiplexing method or technique where the recording (writing) of stacks of holograms is spatially overlapped. The spacing between stacks may be at least the beam waist, which is the narrowest part of the signal beam. An aperture may be placed in the system at the beam waist. During recovery, all of the overlapped holograms at a given multiplexing angle may be recovered, but only the hologram that is centered in the aperture is passed through to the recovery optics. Examples of polytopic recording techniques that may be used in various embodiments of the present invention are described in U.S. Pat. App. No. 2004/0179251 (Anderson et al.), published Sep. 16, 2004; and U.S. Pat. App. No. 2005/0036182 (Curtis et al.), published Feb. 17, 2005, the entire disclosure and contents of which are hereby incorporated by reference.

For the purposes of the present invention, the term "fractal multiplexing" refers to multiplexing where the angle is changed in a direction which not as Bragg selective until the reconstruction is moved off the detector (e.g., camera).

For the purposes of the present invention, the term "spatial light modulator" (SLM) refers to a device that stores information on a light beam by, for example, modulating the spatial intensity and/or phase profile of the light beam.

For the purposes of the present invention, the term "spatial light intensity" refers to a light intensity distribution or pattern of varying light intensity within a given volume of space.

For the purposes of the present invention, the term "recovering holograms" refers to retrieving, recovering, reconstructing, reading, etc., holograms recorded in a holographic storage medium.

For the purpose of the present invention, the term "device" may refer to an apparatus, a mechanism, equipment, machine, controller, etc., such as, for example, a holographic data storage device.

For the purposes of the present invention, the term "SNR" refers to the signal to noise ratio.

For the purposes of the present invention, the term "reserved block" refers to a pixel pattern which is independent of the surrounding pixels and is located at known position (or positions) within a data image and which embeds known data patterns within each hologram. Reserved blocks may serve, for example, as fiducials for alignment and/or SNR measurements.

For the purposes of the present invention, the term "fiducial" (also referred to as a "fiducial marker") refers to an object (or objects) used in the field of view of an imaging system which appears in the image produced and may be used as a point of reference or a measure for alignment.

Figure 3:
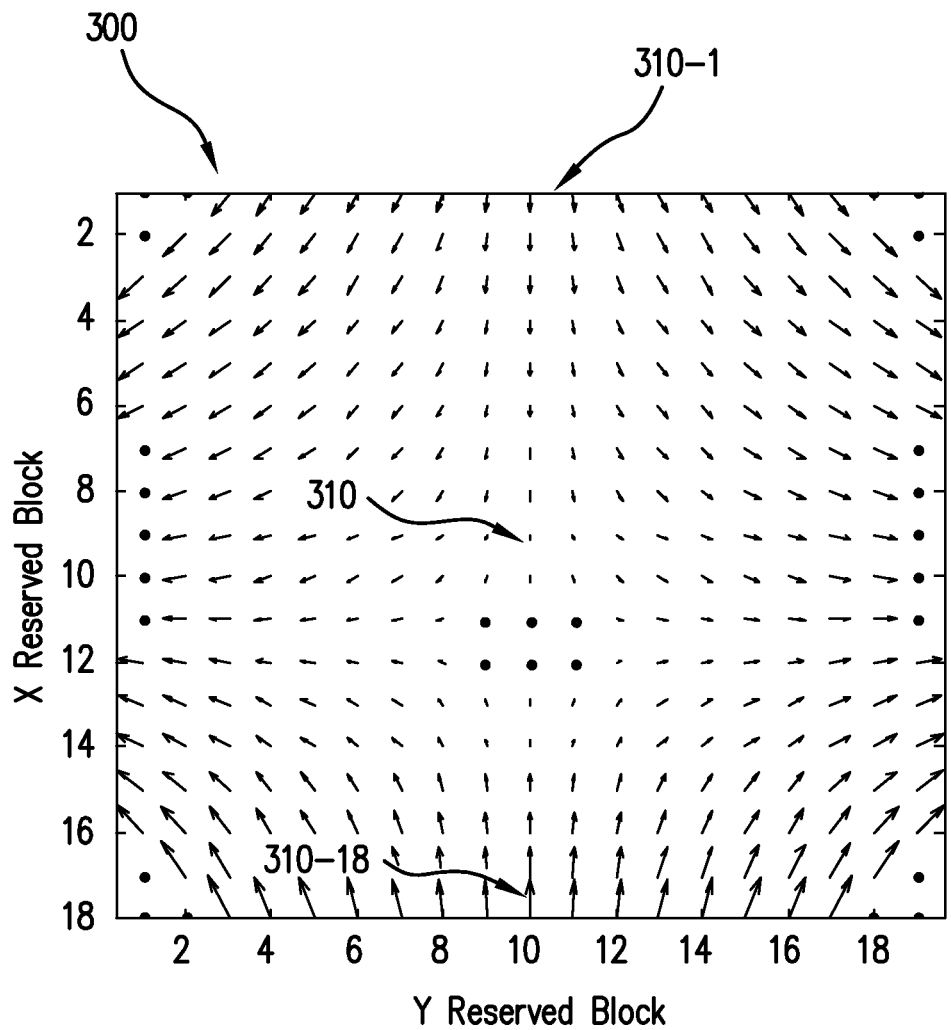
FIG. 3 is a diagram illustrating a distortion pattern ("quiver pattern") which might occur in an exemplary holographic data storage (HDS) system when the Bragg mis-match of the angular deviation of the probe beam is $\Delta\theta_P$=0.026°.

For the purposes of the present invention, the term "quiver pattern" refers to a representation of a holographic image distortion pattern where the quiver vectors (which may be represented as "arrows") in the pattern represent the x,y-dimensional holographic image displacement at specific sampled locations with respect to their nominal location. An example of a quiver pattern is shown in FIG. 3.

For the purposes of the present invention, the term "quiver pattern vector" refers to a quiver pattern wherein the x,y-components of all the individual quiver vectors are arranged into a single row or column vector.

For the purposes of the present invention, the term "characteristic misalignment quiver pattern vector" refers to a quiver pattern vector that would be observed in an ideal system as the result of misalignment of a specific alignment control axis by a specific amount.

For the purposes of the present invention, the term "quiver error signal" refers to a measurement of misalignment derived from a quiver pattern.

For the purposes of the present invention, the term "centroid" refers to the conventional sense of the intersection of all hyperplanes that divide an object (e.g., a sphere) into two parts of equal moment about a hyperplane.

For the purposes of the present invention, the term "intensity centroid" refers to a two-dimensional centroid calculated from the intensity of an image. For example, the x and y intensity centroid coordinates, $c_x$ and $c_y$, of an image are given by Equation 1:

$$c_x = \frac{\sum_{x,y} x I(x,y)}{\sum_{x,y} I(x,y)}, \quad c_y = \frac{\sum_{x,y} y I(x,y)}{\sum_{x,y} I(x,y)} \tag{1}$$

wherein $I(x,y)$ is the image pixel value as a function of the Cartesian coordinates x and y, or is the image intensity map as a function of the coordinates x and y.

For the purposes of the present invention, the terms "image intensity map" and "intensity map" refer interchangeably to a lower resolution version of an image. For example, a summing up of all of the 1024 pixel values within each a 32×32 pixel sub-block of an image to produce a smaller image creates an "intensity map." FIGS. 8 through 11, 14, 15, 17, and 18 (as described below) illustrate examples of such intensity maps having a 36×37 sample grid.

For the purposes of the present invention, the term "centroid shift" refers to the difference between the respective intensity centroid coordinates of two images.

For the purposes of the present invention, the term "centroid shift error signal" refers to a measurement of misalignment derived from a centroid shift.

For the purposes of the present invention, the term "polarization density patch" refers to a Fourier transform of the spatial electric dipole polarization complex amplitude distribution induced by a probe beam corresponding to an individual hologram.

For the purposes of the present invention, the terms "misalignment" and "misaligned" refer to a parameter, for example, a probe beam alignment control axis, a holographic storage medium alignment control axis, etc., which is out of alignment, offset, skewed, distorted, etc. Misalignment (for example, of an alignment control axis) may lead to suboptimal recovery of holograms.

For the purposes of the present invention, the terms "Bragg-matched" and "Bragg-matching" refer to the illumination of a holographic grating by a probe beam in a manner which satisfies an optimal Bragg diffraction condition. For example, the part or portion of a polarization density patch which lies on a k-sphere is considered Bragg-matched. See description below with reference to FIGS. 5 through 7 which illustrates what is meant herein by "Bragg-matched" and "Bragg-matching."

For the purposes of the present invention, the terms "Bragg-mismatching" and "Bragg-mismatched" refer to the illumination of a holographic grating by a probe beam in a manner which does not satisfy the optimal Bragg diffraction condition. For example, the part or portion part of a polarization density patch which does not lie on a k-sphere is considered Bragg-mismatched. See also description below with reference to FIGS. 2, 3, and 5 through 7 which illustrates what is meant herein by "Bragg-mismatched" and "Bragg-mismatching."

For the purposes of the present invention, the term "probe beam angle" refers to an angle of the probe beam incident on the holographic storage medium in the plane containing the reference and signal beam optical axes.

For the purposes of the present invention, the term "probe beam pitch" refers to the probe beam angle in a direction perpendicular to the plane containing the reference and signal beam optical axes.

For the purposes of the present invention, the term "probe beam wavelength" refers to a wavelength of the probe beam during recovery of holograms.

For the purposes of the present invention, the term "crosstalk" refers to any signal unintentionally affecting another signal.

For the purposes of the present invention, the term "alignment control axis" refers to an axis which may be adjusted to align a parameter in a holographic storage device or system to achieve a more optimal position for recovery of a recorded hologram. Alignment control axes may include probe beam alignment control axes, holographic storage medium alignment control axes, hologram shift position, hologram exposure timing, wavelength tuning, etc.

For the purposes of the present invention, the term "probe beam alignment control axis" refers to an alignment control axis which may be adjusted to align the probe beam in a holographic storage device or system to or towards a more optimal recovery position for recovery of a recorded hologram. Probe beam alignment control axes may include the probe beam angle (also referred to as the "$\phi$ axis"), the probe beam wavelength (also referred to as the "$\lambda$ axis"), and the probe beam pitch (also referred to as the "$\rho$ axis"), as well as any combination of these axes.

For the purposes of the present invention, the term "holographic storage medium alignment control axis" refers to an alignment control axis which may be adjusted to align the holographic storage medium in a holographic storage device or system to or towards a more optimal recover position for recovery of a recorded hologram. For a disk-shaped holographic storage medium, the holographic storage medium alignment control axes may include the radial translational axis (also referred to as the "r axis"), and the rotational axis (also referred to as the "$\kappa$ axis").

For the purposes of the present invention, the terms "feedback error signal" and "feedback alignment error signal" refer interchangeably to a feedback signal derived from alignment-indicating data from a recovered hologram(s), which identifies, detects, measures, quantifies, etc., a misalignment in one or more alignment control axes (e.g. a probe beam alignment control axis or axes) of a recovered hologram(s), and which may be used to adjust the at least one alignment control axis to or towards a sufficiently optimal recovery position for recovery of a hologram(s).

For the purposes of the present invention, the term "wobble" refers to imparting an offset to one or more alignment control axes during the sampling of recovered holograms. For example, an embodiment of a probe beam angle wobble may involve imparting an alternating positive (+) or negative (−) angular offset to even numbered and odd numbered holograms. While wobbles may be imparted in an alternating manner (e.g., a positive (+) wobble, then a negative (−) wobble, and so forth), wobbles may also be imparted in a non-alternating manner (e.g., two consecutive positive (+) wobbles, then followed by two consecutive negative (−) wobbles, and so forth). Wobble(s) may also be imparted to the alignment control axis to be aligned or adjusted, or may be imparted to a different alignment control axis to generate data for aligning an alignment control axis to which the wobble is not imparted. For some embodiments of the present invention, the wobble offset imparted may be relatively small, for example, ∼±0.002° in the case of an alternating probe beam angle wobble.

For the purposes of the present invention, the term "wobble error signal" refers to a detected misalignment based on sampled holograms while one or more alignment control axes are being subjected to wobble. For example, where an alternating angular offset is imparted during sampling of even numbered and odd numbered holograms, as measured by the respective SNRs, an angle wobble error signal may be indicated by a difference in the SNRs of the even numbered and odd numbered holograms (e.g., by not being centered about the respective SNR peaks); a pitch wobble error signal may be indicated by a shift in the x-component of the intensity centroids of the even numbered and the odd numbered holograms (see description below with reference to FIGS. 5 through 11). The alignment control axis for which the wobble error signal relates to may be the same alignment control axis to which wobble is imparted, or may be a different alignment control axis from the one to which wobble is imparted.

For the purposes of the present invention, the term "alignment-indicating data" refers to data from one or more recovered holograms which may be used to indicate, measure, detect, determine, quantify, etc., the magnitude and/or direction of misalignment (alignment error) from the nominal for a hologram. Such alignment-indicating data may include quality metrics, such as SNR values, diffracted beam intensity, total image intensities, distortions of the holographic image(s) (e.g., from quiver patterns), changes (shifts) in the position of the intensity centroid of the detected image, changes in the intensity patterns (e.g., intensity map) of the detected images, etc.

For the purposes of the present invention, the term "optimal recovery position" refers to a recovery position where the recovered hologram has the highest quality, e.g., the highest SNR, no or minimal errors, distortions, degradations, etc., affecting the quality of, properties of, condition of, images, data or information provided by, etc., the recovered hologram, etc.

For the purposes of the present invention, the term "displacement from the optimal recovery position" refers to the difference (in direction and magnitude) between the optimal recovery position (i.e., the position where the recovered hologram has the highest quality), and the actual position from which the hologram is recovered.

For the purposes of the present invention, the term "feedforward signal" refers to a signal derived from recording and recovery operating condition data for a hologram(s), and which may be used to adjust the at least one alignment control axis to or towards a sufficiently optimal recovery position for recovery of a hologram(s).

For the purposes of the present invention, the term "recording and recovery operating condition data" refers to data relating to one or more operating condition parameters which may differ in some measurable, predictable, calculatable, etc., way or aspect between the recording and recovery of a given hologram, and which may be used to derive a feedforward signal. These operating condition parameters may include temperature, humidity, pressure, exposure history for recording and recovering holograms, compositional parameters of the holographic storage medium affected by operating conditions (e.g., medium parameters relating shrinkage, coefficient of thermal expansion, etc.), etc., as well as combinations of any of these operating condition parameters.

For the purposes of the present invention, the term "recovery position" refers to the n-tuple of positional values of all, or a subset, of the alignment control axes (e.g. [r, $\theta$, $\lambda$, $\phi$, $\rho$] axes, hologram shift position, hologram exposure timing, wavelength tuning, etc.) which may be used to define the position of the hologram during recovery from the holographic storage medium.

For the purposes of the present invention, the term "sufficiently optimal recovery position" refers to a recovery position for a hologram which is the optimal recovery position for the recovered hologram or which is sufficiently close to, approaches, etc., the optimal recovery position such that the quality of the recovered hologram has a sufficiently high SNR, no or minimal errors, distortions, degradations, etc., affecting the quality of, properties of, condition of, images, data or information provided by, etc., the recovered hologram, etc.

For the purposes of the present invention, the term "optimum recovery position" refers to a recovery position for a hologram where the recovered hologram has the highest quality, e.g. no or minimal errors, distortions, degradations, etc., affecting the quality of, properties of, condition of, images, data or information provided by, etc., the recovered hologram.

For the purposes of the present invention, the term "starting position" refers to the initial position for the alignment control axis or axes at the beginning of an iterative alignment procedure.

For the purposes of the present invention, the term "offset" refers to a difference between a baseline value (for example, a nominal alignment control axis position), and a displacement from that baseline value. These offsets may be alternating and opposite offsets, for example, positive (+) or negative (−) offsets such as, for example, a wobble imparted to a nominal position of an alignment control axis, may be non-alternating offsets, for example, imparting two or more consecutive positive (+) or negative (−) offsets, etc.

For the purposes of the present invention, the term "alignment value" refers to the degree of displacement in terms of magnitude and/or direction from an optimal position for an alignment control axis, as determined a-priori or from a measurement procedure, e.g. based on alignment-indicating data. An "optimal alignment value" refers to an alignment value wherein the alignment control axis is at an optimal or sufficiently optimal recovery position.

For the purposes of the present invention, the term "threshold alignment error criteria" refers to a criteria used to determine when the magnitude of an alignment error (e.g. as shown by the alignment value) is minimal or small enough such that an alignment control axis is considered to be at a sufficiently optimal recovery position for the holograms, and thus requires no further adjustment of the alignment control axis.

For the purposes of the present invention, the term "in a manner that reduces alignment error" refers to an adjustment of an alignment control axis which tends to reduce the magnitude of the alignment error of that axis.

For the purposes of the present invention, the term "sampling," in the context of taking holographic image exposures, refers to the recovery of selected holograms for the purpose of detecting, determining, quantifying, etc., the alignment or misalignment of one or more alignment control axes. Accordingly, as used in this context, "sampling" may refer to obtaining, detecting, and analyzing the resulting diffracted beam from the selected holograms recovered.

For the purposes of the present invention, the term "exposure," in the context of recovery of holograms, refers to the illumination of a holographic storage medium with a probe beam and the detection of the resulting diffracted beam. In the context of recording holograms, "exposure" refers to the illumination of a holographic medium with a signal beam and a reference beam in order to record the resulting interference pattern.

For the purposes of the present invention, the term "controller" refers to a system, device, machine, mechanism, computer, processor, microprocessor, integrated circuit, etc., which creates, produces, provides, generates, etc., data, results, outputs, signals, instructions, commands, etc., from inputs to, for example, a control system compensation algorithm and/or uses the data, results, outputs, signals, instructions, commands, etc., for example, from the control system compensation algorithm to adjust one or more alignment control axes. Controllers may include, for example, control loop feedback mechanisms, such as proportional-integral-derivative (PID) controllers, microcontrollers, programmable logic (PLC) controllers, etc.

For the purposes of the present invention, the term "servo" refers to a method, technique, algorithm, procedure, routine, etc., for minimizing a system or device error by feedback.

For the purposes of the present invention, the term "servomechanism" refers to a device, mechanism, etc., which uses a feedback error signal(s) to correct the performance of a device, machine, apparatus, mechanism, system, etc., where the feedback error signal help controls the mechanical position or other parameters of the mechanism system, etc.

Description

In many instances, optimal data recovery of holograms from a holographic storage medium may not be achieved without feeding back the quality of the diffracted data from the recovered holograms. In angular multiplexing, for example, hundreds of holograms may be multiplexed within a few dozen degrees of probe beam angular range. In some instances, the accuracy required to recover a single hologram may be as small as about ±0.005°, yet mechanical variation may require the actual angular uncertainty to be as much as about ±0.5° under different hologram recovery conditions. In such a case, it may be necessary, for example, to manually align a galvanometer to recover the hologram(s), or to have an electronic controller perform a fine scan of all possible galvanometer positions in order to ascertain the optimal recovery position for the hologram(s). Alternatively, a coarser scan may be performed and an interpolation or peak-fitting calculation may be employed to estimate the optimal position for recovery of the hologram(s).

Because servo signals may be unavailable, the electronic controller may need to rely on hologram recovery data based on a quality metric such as diffracted beam intensity or signal-to-noise-ratio (SNR). But such quality metrics may provide no direct information as to direction and/or magnitude of the misalignment. Consequently, these alignment operations may require more than one, and often may require many read exposures per hologram recovered, thus greatly reducing the maximum hologram recovery rate from the holographic storage medium. Often, the goal may be to recover a number of multiplexed holograms in sequence at the highest practical speed. In order to approach the maximum speed of about one read exposure per hologram, a method for predicting or estimating the optimal location of the next hologram to be recovered in the sequence from information obtained during recovery of the previous holograms may be required.

To provide optimal recovery of holograms from a holographic storage medium, the holograms may be precisely aligned with the probe beam with respect to one or more of three controllable or adjustable alignment control axes of the probe beam. These probe beam alignment control axes are the probe beam angle (the "$\phi$ axis"), the probe beam wavelength (the "$\lambda$ axis"), and the probe beam angle in a direction perpendicular to the plane containing the reference and signal beam optical axes, also referred to as the "probe beam pitch" (the "$\rho$ axis"). Optimal recovery of the holograms may also depend somewhat on the holograms being at least coarsely aligned in the translational (r) and rotational ($\theta$) spatial dimensions or axes of the holographic storage medium (e.g., for disk-shaped holographic storage media). But optimal data recovery of the holograms from the holographic storage medium often depends primarily on the holograms being optimally aligned, or as optimally aligned as possible, with respect to the $\phi$ axis, the $\lambda$ axis, and/or the $\phi$ axis of the probe beam.

Unfortunately, upon playback (recovery) of the holograms, misalignment(s), medium shrinkage (or expansion), thermal effects, and/or other distorting perturbations may cause displacement of the optimal recovery position of the holograms with respect to one or more of these probe beam alignment control axes. One such situation is illustrated in FIG. 1. FIG. 1 is graphical plot, which is indicated generally as 100, of which 78 holograms are recorded by angle multiplexing in a specific volume of a holographic storage medium by varying the reference beam angle from 0.075° to 5.85° in 0.075° increments during a recording operation. FIG. 1 shows these optimal recovery angles, which are represented by a sequence of cross-hatched circles and generally trace a curve, indicated as 104. These optimal recovery angles along curve 104 are displaced relative to the original recording angles, which are represented by a sequence of black circles and which generally trace a straight horizontal line, indicated as 108. For the first, tenth, twentieth, thirtieth, fortieth, fiftieth, sixtieth, seventieth, and seventy-eighth holograms recorded, the optimal recovery angles 104-1, 104-10, 104-20, 104-30, 104-40, 104-50, 104-60, 104-70, and 104-78 indicated, along with the corresponding original recording angles 108-10, 108-20, 108-30, 108-40, 108-50, 108-60, 108-70, and 108-78.

Curve 104 in FIG. 1 also illustrates a dominant low-frequency component, along with a much smaller high-frequency deviation. This dominance of the low-frequency component is characteristic since the holograms are all recorded in the same holographic storage medium volume, and are thus subject to the same dimensional distortions which tend to displace the optimal recovery positions for the holograms by similar amounts in the same direction. As can be seen from FIG. 1, attempting to recover the holograms at the original recording angles (i.e., 108-1 through 108-78) would thus result in recovery errors (e.g., holograms incorrectly recovered, poorer hologram quality, etc.) and/or a reduced margin for error in the location of the holograms, especially where the displacement is relatively high (see, for example, recovery angles 104-50 through 104-78). In FIG. 1, the displacement of the optimal recovery angles has been normalized to zero at the first hologram, which is indicated at 104-1, but there may also be a displacement of optimal recovery angle 104-1 too from the original recording angle. Locating the first hologram in this sequence is important to optimal recovery of the holograms where a sequence of holograms are recovered. But it is also more important to try to follow the low-frequency displacement component of curve 104 so that each subsequent hologram may be more optimally recovered, with each subsequent recovered hologram also being recovered, if possible, in a single read exposure with minimal quality degradation. In some embodiments, alignment of the first hologram in the sequence may be achieved by, for example, using an iterative alignment procedure, as described below in section 4.

While some embodiments of the present invention are illustrated in the context of finding optimal probe beam angles in an angle-multiplexed system, other embodiments of the present invention may also be used to align one or more of the other probe beam alignment control axes (i.e., the probe beam wavelength or "$\lambda$ axis", and/or the probe beam pitch or "$\rho$ axis"), as well as other non-probe beam alignment control axes (e.g., hologram position shifting, hologram exposure timing, wavelength tuning, etc.) to optimize hologram recovery. For example, some embodiments of the present invention may be used to find optimal recovery positions in a shift-multiplexed system (see Psaltis et al., "Holographic Storage Using Shift Multiplexing," *Opt. Lett.* 20:782-784 (1995), the entire contents and disclosures of which are hereby incorporated by reference), wherein the alignment control axis may be the r and/or $\theta$ spatial dimension positions (e.g., for a disk-shaped holographic storage media), or the x- and/or y-spatial dimension positions (e.g. for a rectangular- or square-shaped holographic storage media), or optimal recovery wavelengths in a wavelength-multiplexed system (see Curtis et al., "Cross Talk for Angle- and Wavelength-Multiplexed Image Plane Holograms," *Opt. Lett.* 19:1774-1776 (1994) and Horimai et al., "Collinear Holography," *Appl. Opt.* 44:2575-2579 (2005), the entire contents and disclosures of which are hereby incorporated by reference), wherein the alignment control axis may be wavelength tuning. Some embodiments of the present invention may also adjust multiple alignment control axes simultaneously. For example, an embodiment of multi-axis alignment involving a sequential recovery of holograms is described below in section 1c. See also section 4 below for description of an embodiment of a method for simultaneously aligning the probe beam angle ("$\phi$ axis"), the probe beam pitch ("$\rho$ axis"), and wavelength ("$\lambda$ axis") in the recovery of angle-multiplexed holograms in an iterative procedure.

Embodiments of the present invention provide an estimate of the optimal recovery position for the next hologram in the sequence using available information (data). In one embodiment, the available information (data) may comprise a quality metric, such as the SNR, the diffracted beam intensity, etc., from or for the previously recovered holograms in the sequence. This estimation process may be generally described as comprising three basic steps: (1) deriving a feedback error signal which is an estimate of the direction and magnitude of the misalignment for previously recovered holograms; (2) deriving a feed-forward signal which estimates the optimal alignment value for at least one alignment control axis for one or more holograms in the sequence based on prior knowledge of the recording and recovery operating condition data for the one or more holograms in the sequence; and (3) applying (using) one or both of the feedback error and/or feed-forward signals, for example, as inputs to a control system compensation algorithm (e.g., involving a control processor, such as a controller, using, implementing, applying, executing, etc., such an algorithm) which then generates (e.g., through the control processor, such as a controller) one or more control axis commands to adjust one or more of the alignment control axes of a holographic data storage system or device to provide a sufficiently optimal recovery position for recovery of the next hologram in the sequence to be recovered by the holographic data storage system or device, i.e., used for the recovery of subsequent holograms in the sequence. In other words, the embodiments of the present invention may resemble a servo control system, and thus many of the techniques of analysis and implementation for servo control systems may be used in embodiments of the present invention. See R. C. Dorf, *Modern Control Systems*, (Third Edition, Addison-Wesley Publishing (1983), the entire contents and disclosure of which is hereby incorporated by reference. In some embodiments, adjustment of the alignment control axes to or towards a sufficiently optimal recovery position for a single hologram may be obtained based on a feedback error signal which is derived by an iterative alignment procedure involving only data recovery, for example, from a single hologram.

According to some embodiments of the present invention, either one or both of the feedback error and feed-forward signals may be used to adjust the alignment control axes of the holographic data storage system or device to or towards a sufficiently optimal recovery position. In some embodiments, both feedback error and feed-forward signals are used. The feedback error signal, the feed-forward signal, the control system compensation algorithm to which these signals may be inputted, and iterative alignment procedure aspects, respectively, of such embodiments are described in further detail below:

1. Derivation of Feedback Error Signals
   a. Wobble Error Signals

In one embodiment, a quality metric such as SNR may be used as the basis for deriving a feedback displacement error signal. The SNR may be calculated, for example, by embedding known data patterns within each hologram ("reserved blocks"), and measuring the fidelity of the detected pattern according to a formula, for example, according to Equation 2:

$$SNR = 20 \log_{10}\left(\frac{\mu_1 - \mu_0}{\sigma_1 + \sigma_0}\right) \quad (2)$$

wherein $\mu_1$ and $\mu_0$ are the measured means of the detected ones and zeros, and $\sigma_1$ and $\sigma_0$ are the respective standard deviations, from the reserved block(s). For further details on how to carry out such SNR measurements, see U.S. Pat. Appln. No. 2005/0286388 (Ayres et. al.), published Dec. 29, 2005; Ayres et al., "Image Oversampling for Page-Oriented Optical Data Storage," *Applied Optics*, 45(11):2459-2464 (Apr. 10, 2006); and Ayres, "Signal Modulation for Holographic Memories," ISBN-9780549315193 (2007), the entire contents and disclosures of which are hereby incorporated by reference.

The SNR for a given hologram as a function of probe beam angle generally has the form of a sharp peak, with the SNR reaching a maximum value at an optimal angle and falling off sharply on either side or slope of the peak as the angle deviates from the optimal, and may be approximated by Equation 3:

$$SNR(\phi) = SNR_0 - C(\phi - \phi_0)^2 \quad (3)$$

wherein $\phi$ is the probe beam angle with respect to the medium normal in degrees, $\phi_0$ is the optimal probe beam angle, and $C \cong 8.5 \times 10^3$ dB/degree$^2$ is a constant (which may be empirically derived for the particular system) defining the quadratic peak shape. $SNR_0$, the peak SNR of the hologram, may not be known in advance and indeed may vary somewhat from hologram to hologram. An alignment error indicating both the sign (direction) and magnitude of the probe beam angle error, err=$\phi-\phi_0$, cannot be determined from a single SNR sample. However, from this SNR peak model, the derivative of SNR ($\phi$) is proportional to probe beam angle error, err. The probe beam angle error, err, may thus be determined from two SNR samples offset in $\phi$ according to Equation 4:

$$err = \phi - \phi_0 = \frac{SNR(\phi - \Delta\phi) - SNR(\phi + \Delta\phi)}{4C\Delta\phi} \quad (4)$$

wherein $\Delta\phi$ is a constant probe beam angle offset.

In order to estimate $\Delta\phi$ while recovering a sequence of holograms with only one exposure which is near the peak SNR for each hologram, it may be necessary that: (1) $\Delta\phi$ be relatively small; and (2) each probe beam angle error, err, sample be calculated from the difference in SNR between two different holograms within the sequence, i.e., according to Equation 5:

$$err_h \approx \frac{SNR_h(\phi_h - \Delta\phi) - SNR_{h-1}(\phi_{h-1} + \Delta\phi)}{4C\Delta\phi} \quad (5)$$

wherein the subscript h denotes the hologram number in the sequence. The nominal probe beam angles $\phi_h$ and $\phi_{h-1}$ should be separated by the true spacing between holograms h and h−1 in order to produce the most accurate estimate. In one embodiment, $\phi_h$ and $\phi_{h-1}$ may be the estimated positions for the h$^{th}$ and h−1$^{th}$ holograms determined by the control system compensation algorithm, as described below in section 3. Inaccuracy in these positions may translate into inaccuracy (noise) in the error signal. Additionally, differences in the peak SNRs, $SNR_{0,h}$ and $SNR_{0,h-1}$, may produce error signal noise, as may departures in the actual peak shape compared to the ideal.

The probe beam angle offsets may also be applied, with the opposite sign, according to Equation 6:

$$err_h \approx \frac{SNR_{h-1}(\phi_{h-1} - \Delta\phi) - SNR_h(\phi_h + \Delta\phi)}{4C\Delta\phi} \quad (6)$$

In one embodiment, the probe beam angle offset $\Delta\phi$ may be applied with an alternating polarity, e.g. holograms are recovered at $\phi_h-\Delta\phi$ when h is even (i.e., an even numbered hologram), and $\phi_h+\Delta\phi$ when h is odd (i.e., an odd numbered hologram). Equation 5 above may then be used for even numbered holograms, h, while Equation 6 above may be used for odd numbered holograms, h, so that an $err_h$ sample is generated for every hologram recovery. This approach may be considered analogous to "wobble tracking" for conventional optical disk drives, wherein following of the data track is accomplished by imparting a low frequency, alternating offsets ("wobble") to the playback head back and forth across the data track, and deriving a tracking error signal proportional to the difference between the signal strength at the opposite wobble offsets. See Marchant, *Optical Recording: A Technical Overview*, (Addison-Wesley Publishing, 1990), pp. 180-181.

One disadvantage of wobble tracking is that there may be a diminution of signal quality since the average positioning error is not zero. This effect may be mitigated if the wobble displacement, $\Delta\phi$, is made as small as possible. For example, if $\Delta\phi=\pm0.002°$, then the SNR loss due to the wobble itself is only 0.034 dB given the peak model of Equation 3 above.

In alternative embodiments, the wobble technique may be used with alignment control axes other than the probe beam angle. For example, in a shift multiplexing system (see Psaltis et al., "Holographic Storage Using Shift Multiplexing," *Opt. Lett.* 20:782-784 (1995) and Horimai et al., "Collinear Holography," *Appl. Opt.* 44:2575-2579 (2005), the entire contents and disclosures of which are hereby incorporated by reference), a x-dimensional spatial position wobble offset of $\pm\Delta x$ (wherein the x-dimensional spatial position may correspond to, for example, the r, $\theta$, x-, and/or y-spatial positions) may be applied to the recovery positions of the holograms in order to produce a feedback error signal for correcting hologram shift positions. Alternatively and equivalently, a timing wobble offset of $\pm\Delta t$ may be imparted to the recovery exposure sampling interval while the holographic storage medium is shifting at a velocity (e.g., constant velocity) to correct for hologram exposure timing for shift multiplexing. This may be considered to be equivalent to wobbling the "$\theta$-axis" and possibly the "r-axis" spatial position of a rotating holographic storage disk medium wherein the spatial sampling position of the medium is wobbled a very small amount. In another example, a probe beam wavelength wobble offset of $\pm\Delta\lambda$ may be imparted to the wavelength of the probe beam to produce a feedback error signal for correcting wavelength tuning (and may be useful for any system, whether or not it employs wavelength multiplexing). Generally, embodiments of the present invention allow for the perturbation of any alignment control axis signal in order to detect the local gradient of signal quality, and then to seek a local maximum.

In other alternative embodiments, a quality metric other than the SNR may be maximized. For example, the diffracted beam intensity may be employed, or a detected bit error rate (e.g., the number of bit errors in the reserved blocks; or the number of cyclic redundancy check (CRC) errors) may be determined over a section of known data. The choice of quality metric is independent of the choice of control axis (or axes), and all combinations thereof may considered in embodiments of the present invention. For example, a $\pm\Delta\phi$ wobble may be used with a quality metric maximizing diffracted beam intensity in an angle multiplexing system, or an $\pm\Delta x$ wobble may be used with a quality metric minimizing detected bit errors in a shift multiplexing system.

b. Quiver Error Signals

In an alternate embodiment of the invention, the probe beam misalignment, $err_i$, for example, may be measured by detecting a slight distortion of the holographic image which occurs when the probe beam angle used for hologram reconstruction (recovery) differs from the optimal Bragg angle. For example, when a Bragg-mismatched plane wave probe beam with wave vector $\vec{k}_P$ illuminates an ideal plane wave grating, the angle of the diffracted beam may deviate from the nominal Bragg-matched diffraction angle according to Equation 7:

$$\Delta\theta_D \sin\theta_S = \Delta\theta_P \sin\theta_R \quad (7)$$

wherein $\theta_R$ and $\theta_S$ are the internal propagation angles, respectively, of the reference and signal beams with respect to the medium normal, $\hat{n}$, (and which are nominally the Bragg-matched probe and diffraction angles); and $\Delta\theta_P$ and $\Delta\theta_D$ are, respectively, the deviations of the internal probe and diffracted beams from the Bragg-matched condition.

Figure 2:
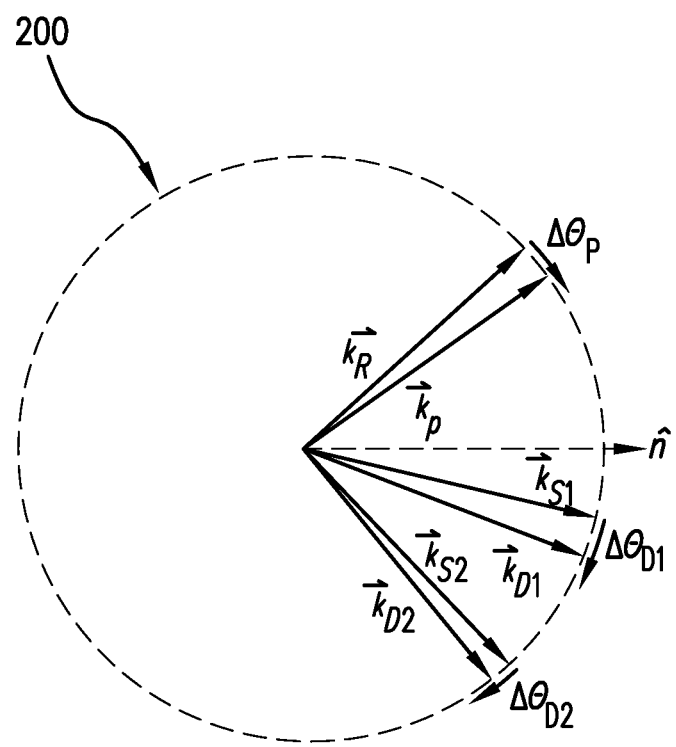
FIG. 2 is a diagram illustrating off-Bragg distortion in k-space, and showing how non-linear dependence of the diffracted beam deviation on the Bragg-matched angles may cause distortion in a holographic image.

The non-linear dependence of the diffracted beam deviation on the Bragg-matched angles may cause distortion in the holographic image, as illustrated by FIG. 2. FIG. 2 provides a diagram, indicated generally as 200, to conceptually illustrate such off-Bragg image distortions in k-space. Diagram 200 shows the medium normal, $\hat{n}$, (which is a unit vector perpendicular to the surface of the medium, and represented in FIG. 2 as a dashed line vector), the wave vector for the probe beam, indicated as $\vec{k}_P$, the wave vector for the reference beam, indicated as $\vec{k}_R$, the wave vector for a first pixel in the signal beam, indicated as $\vec{k}_{S1}$, the wave vector for a second pixel in the signal beam, indicated as $\vec{k}_{S2}$, a first diffracted wave vector (corresponding to the first pixel in the signal beam), indicated as $\vec{k}_{D1}$, and a second diffracted wave vector (corresponding to a second pixel in the signal beam), indicated as $\vec{k}_{D2}$. Diagram 200 also shows the angular deviation for the probe beam from Bragg-matched conditions, indicated as $\Delta\theta_P$, between wave vector $\vec{k}_P$ and wave vector $\vec{k}_R$, the angular deviation of a first diffraction angle, indicated as $\Delta\theta_{D1}$, between wave vector $\vec{k}_{S1}$ and wave vector $\vec{k}_{D1}$, and the angular deviation of a second diffraction angle, indicated as $\Delta\theta_{D2}$, between wave vector $\vec{k}_{D2}$ and wave vector $\vec{k}_{D2}$. As shown in FIG. 2, wave vector $\vec{k}_P$ for the probe beam is Bragg-mismatched, relative to wave vector $\vec{k}_R$, by the angular deviation $\Delta\theta_P$, thus causing different diffraction angle deviations, i.e., $\Delta\theta_{D1}\neq\Delta\theta_{D2}$, at different diffraction angles. Therefore, a holographic data image spanning the angular range between diffracted wave vectors $\vec{k}_{D1}$ and $\vec{k}_{D2}$ may suffer a deterministic distortion pattern, and not merely a shift in position, when the probe beam is Bragg-mismatched by the angular deviation $\Delta\theta_P$.

The Bragg-mismatch created by the angular deviation $\Delta\theta_P$ of the probe beam may also cause image distortion out of the plane of FIG. 2 when the signal beam pixel wave vectors involved have components extending out of the plane of FIG. 2. FIG. 3 is an illustration of such a distortion pattern which might occur in an exemplary holographic data storage (HDS) system when the Bragg-mismatch of the angular deviation of the probe beam is, for example, $\Delta\theta_P=0.026°$. The quiver vectors (represented in FIG. 3 as "arrows") in the quiver pattern, which is indicated generally as 300, represent the local image displacement sampled on a grid of 64×64 pixels from within a 1200×1200 pixel image. The global translation and magnification terms have also been removed from the image shown in FIG. 3, thus leaving only the non-rigid body distortion pattern. The length of the arrows shown in quiver pattern 300 of FIG. 3 have also been greatly exaggerated. In fact, the maximum displacement of any image pixel from nominal is approximately 2% of the pixel spacing. The vertical axis (X Reserved Block) in FIG. 3 corresponds to the Bragg-selective direction, so that the pixels corresponding to diffracted wave vectors $\vec{k}_{D1}$ and $\vec{k}_{D2}$ shown in FIG. 2 would be located approximately at the bottom and top of the middle column (indicated generally as 310) of arrows, with the arrows corresponding to diffracted wave vectors $\vec{k}_{D1}$ and $\vec{k}_{D2}$ being indicated, respectively, as 310-18 and 310-1 in FIG. 3.

In a small internal probe beam angle deviation $\Delta\theta_P$ regime, the quiver pattern will resemble what is shown as pattern 300 in FIG. 3, except that the magnitude of the whole pattern may change in proportion to internal probe beam angle deviation $\Delta\theta_P$. Pattern 300 may even flip (i.e., with all arrows in pattern 300 reversing direction) when the probe beam angle deviation $\Delta\theta_P$ is negative. Extracting the magnitude and sign from the characteristic Bragg misalignment quiver pattern 300 shown in FIG. 3 within the quiver pattern of a recovered hologram may thus allow the internal probe beam angle deviation $\Delta\theta_P$ to be determined, and hence the error signal $err_h$, since $err_h$ is merely the external probe beam angle deviation corresponding to the internal probe beam angle deviation $\Delta\theta_P$.

Quiver pattern 300 shown in FIG. 3 may be extracted from every hologram in the course of recovering user data. Basically, a pattern matching operation may be used to precisely locate, for example, 320 fiducial patterns embedded within the holographic image (the fiducials correspond to the reserved block patterns used for the SNR calculation as described above section 1a). The quiver pattern maybe represented as an array of 320 vectors indicating the x- and y-displacement from nominal for each fiducial pattern. For further details on using quiver patterns, see U.S. Pat. Appln. No. 2005/0286388 (Ayres et. al.), published Dec. 29, 2005; Ayres et al., "Image Oversampling for Page-Oriented Optical Data Storage," *Applied Optics*, 45(11):2459-2464 (Apr. 10, 2006); and Ayres, "Signal Modulation for Holographic Memories," ISBN-9780549315193 (2007), the entire contents and disclosures of which are hereby incorporated by reference Given the availability of the quiver pattern, all that remains is to extract the component corresponding to the characteristic misalignment pattern shown in FIG. 3. This may be determined by calculating the projection of the measured quiver pattern onto the ideal misalignment pattern according to Equation 8:

$$err_h = \frac{err_B}{\|\vec{Q}_B\|} \vec{Q}_B \cdot \vec{Q}_h \quad (8)$$

wherein $err_B$ is the misalignment of the characteristic misalignment quiver vector, $\vec{Q}_B$, and $\|\vec{Q}_B\|$ is its 2-norm, $\vec{Q}_h$ is the measured quiver pattern vector, and the binary operator is the dot product of vectors $\vec{Q}_B$ and $\vec{Q}_h$. The quiver pattern vectors $\vec{Q}_B$ and $\vec{Q}_h$ are formed simply by taking the scalar x- and y-components of the individual quiver vectors in the corresponding quiver patterns and arranging them into a single 640-element column vector. The normalized misalignment vector $$\frac{err_B}{\|\vec{Q}_B\|} \vec{Q}_B$$

may be pre-computed so that the only operation required in real time is the 640-element dot product.

Figure 4:
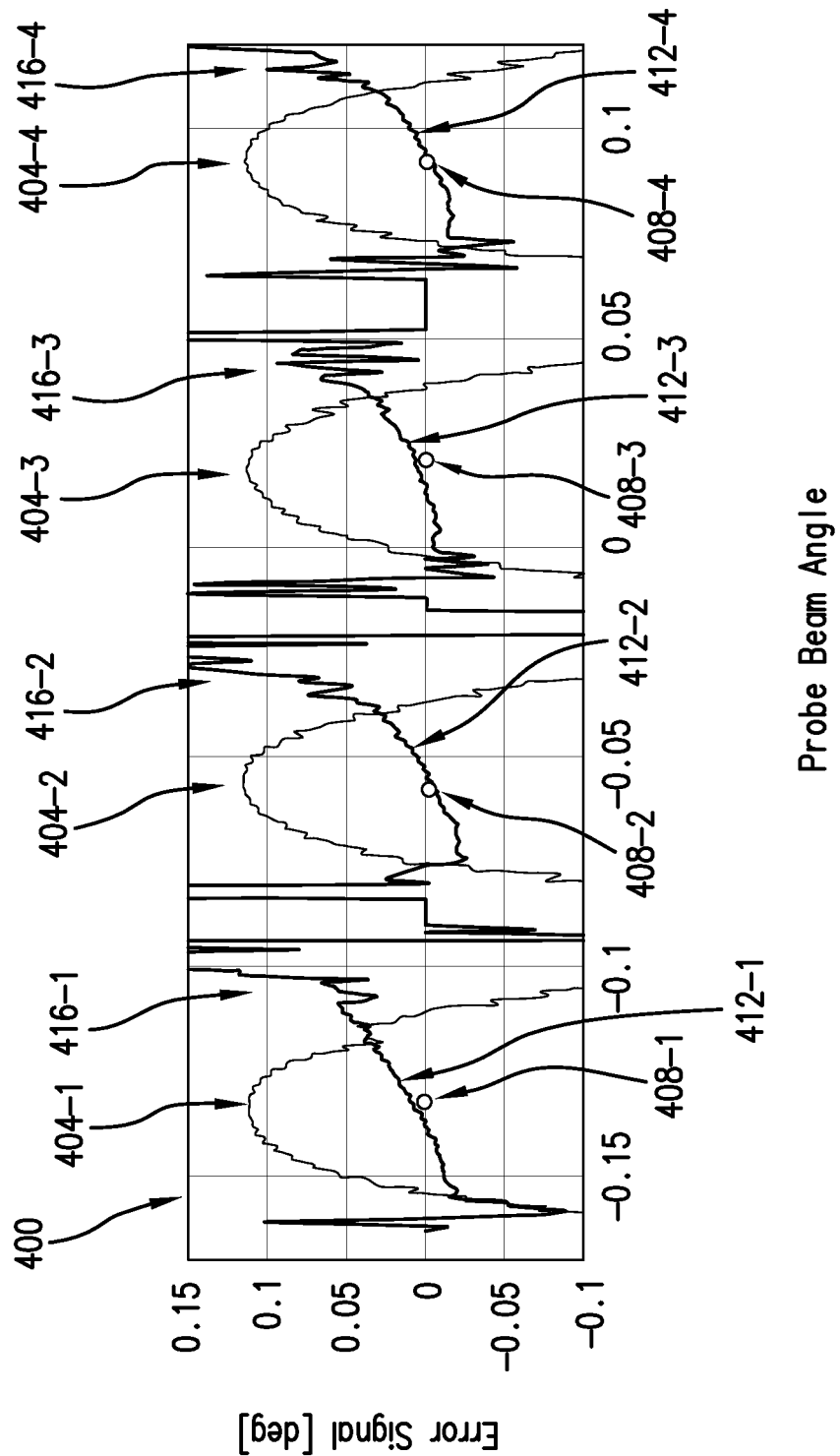
FIG. 4 is an experimental plot of an error signal demodulated every 0.001° in a probe beam angle extracted from a quiver pattern, and showing the positions of four holograms in the scan range, including the respective SNR peaks, error signals, etc.

FIG. 4 is an experimental plot, indicated generally as 400, of an error signal demodulated every 0.001° in a probe beam angle. The positions of the four holograms in the scan range are indicated by the four peaks (indicated as 404-1, 404-2, 404-3, and 404-4), which indicate the relative SNR of each hologram when recovered at the probe beam angular position. The open circles (see 408-1, 408-2, 408-3, and 408-4) indicate the positions of SNR peaks 404-1, 404-2, 404-3, and 404-4, respectively, which are the optimal recovery positions. In the regions of high SNR, the error signals (indicated as 412-1, 412-2, 412-3, and 412-4) each resemble a relatively straight, upwardly sloped line proportional to the distance to the optimal recovery position. In between the holograms where the quiver pattern may not be accurately ascertained, the signals may be erratic (see, for example, those portions indicated as 416-1, 416-2, 416-3, and 416-4). However, the feedback error signal is accurate over a relatively large range near the peak (e.g., 404-1, 404-2, 404-3, and 404-4).

In an alternative embodiment, the characteristic misalignment quiver vector may be pre-processed in order to enhance measurement accuracy. For example, the magnification component of $\vec{Q}_B$ may be removed so that operating conditions which produce magnification or demagnification in the $\vec{Q}_h$ quiver pattern (for example, a wavelength change, or expansion of the holographic storage medium) do not introduce a spurious component in the error signal. The rotation component, as well as the x- and y-translation components, of the holographic image may be similarly removed.

More generally, misalignment in other alignment control axes and/or other changes in operating conditions may cause their own characteristic quiver patterns. When several different perturbations are simultaneously present, the combined quiver pattern may contain elements of all these characteristic distortions. This may permit simultaneously determining the misalignment of several alignment control axes from a single quiver pattern. However, since the set of characteristic quiver patterns may not be mutually orthogonal, the misalignments determined by the preceding method may contain considerable cross-talk among alignment control axes. Furthermore, the composite quiver pattern of a real hologram may not be guaranteed to be a linear superposition of characteristic quiver patterns, although this assumption may be accurate in a small perturbation regime.

For these reasons, it may be desirable to use a pre-processing operation that removes or reduces the mutual cross-talk contributions from the entire set of characteristic quiver patterns. In one embodiment, this may be accomplished using a least squares error (LSE) optimization criterion. For example, it is assumed that N different normalized characteristic quiver patterns vectors, $\vec{Q}_n$, $1 \leq n \leq N$, have been determined, each corresponding to a different misalignment (wavelength tuning error, rotation or translation of the medium, etc.) or operating condition parameter (temperature, etc.). Some characteristic quiver patterns may correspond to alignment control axes, but others may correspond to distortions caused by misalignment or imperfections that are not adjustable by the controller. In this case, the probe beam angle error described above might be one among the N. Then, a simultaneous estimation of all N axes from a measured quiver pattern vector $\vec{Q}_h$ in matrix form may be made according to Equation 9:

$$\hat{\vec{e}}_h = Q\vec{Q}_h, \tag{9}$$

wherein $\hat{\vec{e}}_h$ is an N element vector of estimated misalignment values, and Q is the quiver pattern observation matrix according to Equation 10:

$$Q \equiv \begin{bmatrix} \vec{Q}_1^T \\ \vec{Q}_2^T \\ \vdots \\ \vec{Q}_N^T \end{bmatrix} \tag{10}$$

This version of $\hat{\vec{e}}_h$, however, may still contain cross-talk caused by the non-orthogonal components among the $\vec{Q}_n$. Defining the actual misalignment vector as $\vec{e}_h$, a modified version of Q, referred to as Q', which minimizes the estimation error may be determined according to Equation 11:

$$\hat{\vec{e}}_h = Q'\vec{Q}_h \tag{11}$$

where $\|\hat{\vec{e}}_h - \vec{e}_h\|$ is minimized

A solution to this set of equations may be made according to the LSE estimator matrix Equation 12:

$$Q' = (Q^T Q)^{-1} Q^T \tag{12}$$

wherein $Q^T$ denotes a matrix transpose, and $(Q^T Q)^{-1}$ denotes a matrix inverse. Since the characteristic quiver pattern matrix Q is known before-hand, the LSE estimator matrix Q' may also be pre-computed. Furthermore, the entire set of N values need not be computed simultaneously. If only one axis misalignment is required, the corresponding row of the Q' matrix may be used to compute it with a simple dot product.

c. Centroid Shift Error Signals

In addition to the SNR-maximizing derived wobble error signal described above in section 1a, a wobble imparted to the probe beam recovery positions may be used to determine other misalignments in an angle-multiplexed HDS system. This is possible because the presence of these misalignments cause the wobble offset to produce a shift in the best Bragg-matched region(s) of the holographic image. This shift may be detected, for example, as a change in position of the intensity centroid of the detected holographic image, or by an offset in the position of the highest intensity peak in a cross-correlation between two images. In this section, the intensity centroid method of detecting this shift is described.

Figure 5:
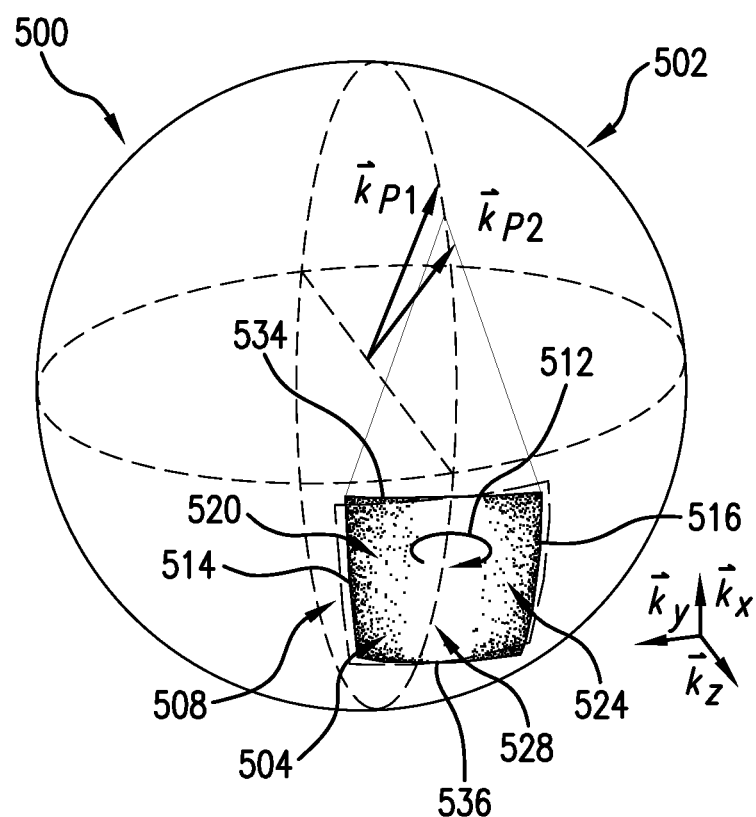
FIG. 5 is a diagram of a k-sphere conceptually illustrating the principle for measuring a centroid shift error signal in k-space.

The principle for this measurement of a centroid shift error signal is conceptually illustrated in FIG. 5 by a diagram, indicated generally as 500, which includes a k-sphere, indicated generally as 502. In diagram 500, the wave vectors $\vec{k}_{P1}$ and $\vec{k}_{P2}$ indicated by the two solid arrows represent two probe beams (P1 and P2) at slightly different angles, with the locus of the polarization density distribution created by the interaction of one of these probe beams P1 or P2 (which are described separately below with reference to FIGS. 6 and 7) with the hologram being indicated by polarization density patch 504. In a perfectly aligned system, polarization density patch 504 would be strongly Bragg-matched, and thus its peak density would lie entirely on the surface of k-sphere 502, as represented by the dashed lines in the general shape of a rectangle 508 (i.e., reflecting no rotational error of patch 504). But as shown in FIG. 5, a probe beam pitch error has been introduced so that position of polarization density patch 504 reflects a rotational error in FIG. 5. This is manifested as a clockwise rotation, indicated by circular arrow 512, of polarization density patch 504 about an axis parallel to x-dimension vector, $\vec{k}_x$, and passing through the tip of the probe wave vector (e.g., probe wave vectors $\vec{k}_{P1}$ or $\vec{k}_{P2}$). This clockwise rotation 512 causes the vertical edges, indicated respectively as 514 and 516, of polarization density patch 504 to "separate" from surface 508 of k-sphere 502, thus indicating Bragg-mismatching. This "separation" of vertical edges 514 and 516 of patch 504 causes a diminished diffraction efficiency towards the edges of the holographic image, represented, respectively, in FIG. 5 by the "darker" shaded portions 520 and 524 of patch 504. The best Bragg-matched part of the image is indicated as "lighter" shaded portion 528, and is approximately in the center of patch 504.

Figure 6:
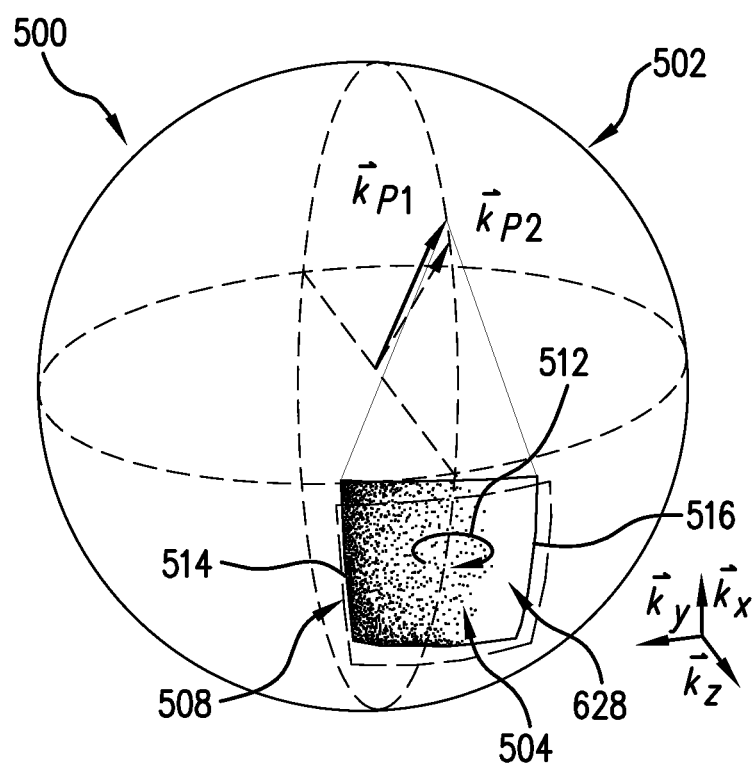
FIGS. 6 and 7 are diagrams of the k-sphere of FIG. 5 which, together, conceptually show a right to left (leftward) centroid shift.

When holographic exposures are taken at the two angular probe beam offsets indicated by probe wave vectors $\vec{k}_{P1}$ and $\vec{k}_{P2}$ in FIG. 5, polarization density patch 504 translates as though it were rigidly attached to the tip of the probe wave vector, which may be either $\vec{k}_{P1}$ or $\vec{k}_{P2}$ depending on which is the "active" probe wave vector representing the offset imparted. This is further conceptually illustrated in FIGS. 6 and 7. As shown in FIG. 6, when $\vec{k}_{P1}$ represents the "active" probe beam offset (as indicated by the solid arrow), while $\vec{k}_{P2}$ represents the "inactive" angular probe beam offset (as indicated by the dashed arrow), the area of intersection between patch 504 and k-sphere 502 shifts rightwards such that the best Bragg-matched part (shown in FIG. 6 as "lighter" shaded portion 628 of patch 504) of the image shifts towards right vertical edge 516 of patch 504. Conversely, as shown in FIG. 7, when $\vec{k}_{P2}$ represents the "active" angular probe beam offset (as indicated by the solid arrow), while $\vec{k}_{P1}$ represents the "inactive" angular probe beam offset (as indicated by the dashed arrow), the area of intersection between patch 504 and k-sphere 502 shifts leftwards such that the best Bragg-matched part (shown in FIG. 7 as "lighter" shaded portion 728 of patch 504) of the image is shifted towards left vertical edge 514 of patch 504.

Figure 7:
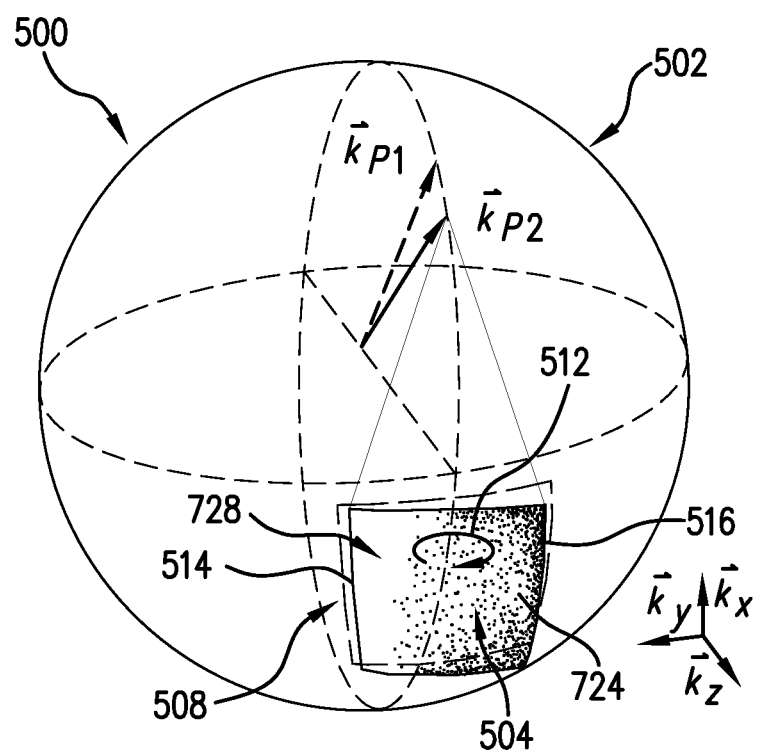

This shifting of the best Bragg-matched part (i.e., "lighter" shaded portions 628 or 728) of the polarization density patch 504 in the y-(horizontal) direction (i.e., as indicated by dimension vector $\vec{k}_y$) conceptually illustrated in FIGS. 6 and 7 may also be detected as a shift in the centroid of the image intensity pattern or image intensity map (hereafter referred to as an "intensity map") of the holographic image, and may also be used to detect probe beam pitch mismatch/misalignment, as further described below. As shown in FIGS. 6 and 7, for a clockwise rotation of patch 504, the best Bragg-matched part 628/728 of the intensity centroid will shift from right to left (i.e., to or towards left vertical edge 514). Conversely, for a counterclockwise rotation of patch 504 (which is not illustrated by FIGS. 6 and 7), the best Bragg-matched part of the intensity centroid will shift from left to right (i.e., to or towards right vertical edge 516). The amount of the centroid shift in the intensity map (right to left, or left to right) is a function of the degree of rotation of patch 504 (clockwise or counterclockwise).

Figure 8:
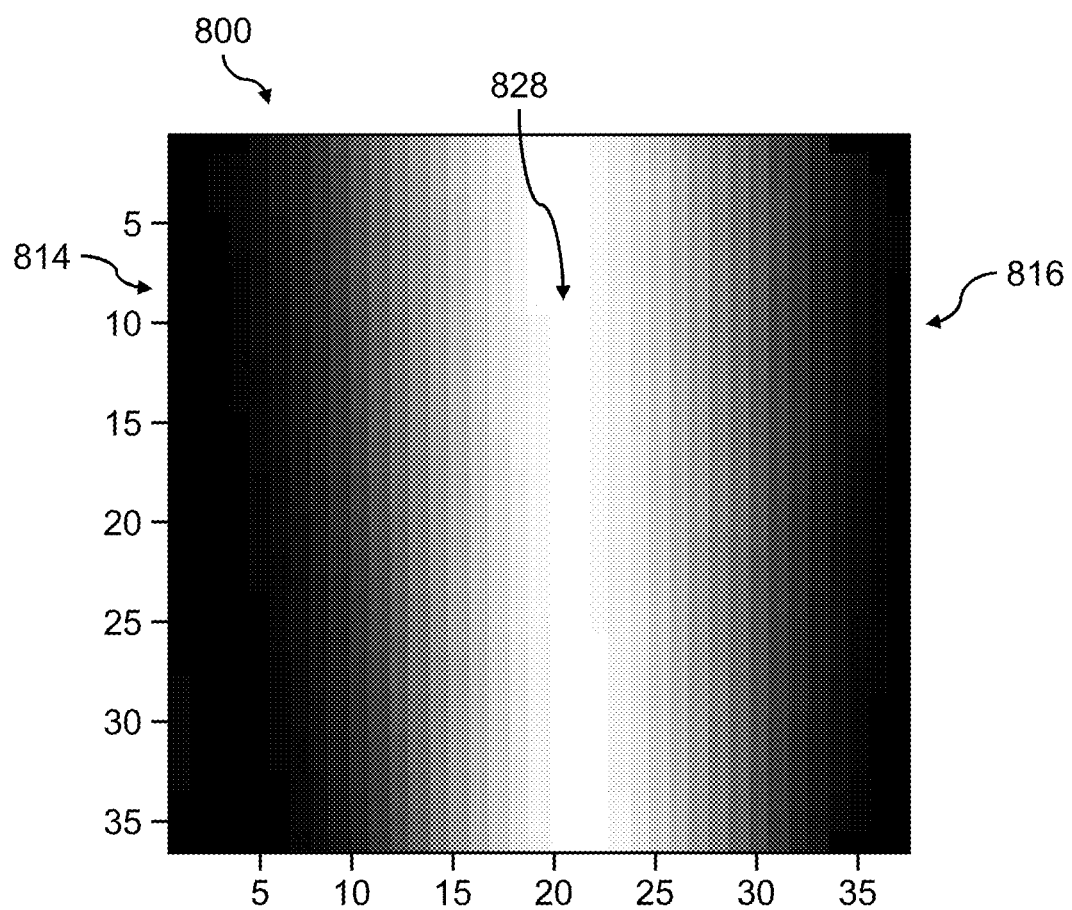
FIGS. 8 and 9 are images of intensity maps (36×37 sample grid) which, together, show a right to left (leftward) shift of a "brighter" Bragg-matched vertical stripe, as conceptually illustrated in FIGS. 6 and 7.
Figure 9:
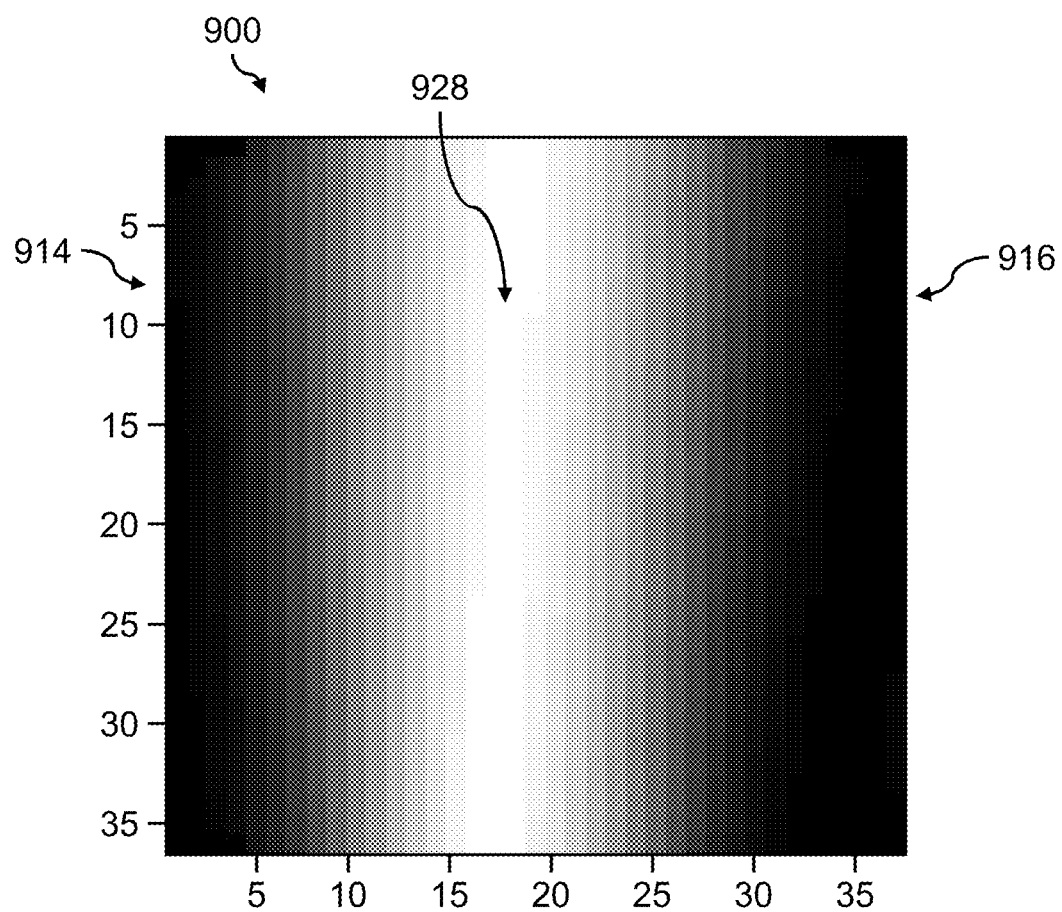

The centroid shift(s) conceptually illustrated in FIGS. 6 and 7 may be physically or visually detected in the form of, for example, intensity map 800 of FIG. 8 and intensity map 900 of FIG. 9. Intensity map 800, which is a 36×37 sample grid, corresponds to the image detected when the holographic storage medium is illuminated by a probe beam with "active" wave vector $\vec{k}_{P1}$, as conceptually illustrated in FIG. 6. "Brighter" vertical stripe 828 of map 800 also corresponds to the best Bragg-matched part 628 of the polarization density patch 504 in FIG. 6, while the left edge of map 800, indicated as 814, also corresponds to the left edge 514 of patch 504, and the right edge of map 800, indicated as 816, also corresponds to the right edge 516 of patch 504. Similarly, intensity map 900, which is also a 36×37 sample grid, corresponds to the image detected when the holographic storage medium is illuminated by a probe beam with "active" wave vector $\vec{k}_{P2}$, as conceptually illustrated in FIG. 7. "Brighter" vertical stripe 928 of map 900 also corresponds to the best Bragg-matched part 728 of the polarization density patch 504 in FIG. 7, while the left edge of map 900, indicated as 914, also corresponds to the left edge 514 of patch 504, and the right edge of map 900, indicated as 916, also corresponds to the right edge 516 of patch 504.

The change in location of "brighter" vertical stripe 928 of FIG. 9, compared to "brighter" vertical stripe 828 of FIG. 8, is detected as a leftward shift of the intensity centroids of the respective images. The effects of probe beam pitch mismatch/misalignment conceptually illustrated in FIGS. 6 and 7 may thus be physically or visually detected by comparing the horizontal back and forth shifting of the "brighter" vertical stripes (i.e., 828 and 928) in maps 800 and 900. For example, as the probe beam angle alternately wobbles, the best Bragg-matched "brighter" vertical stripes (i.e., 828 and 928) of intensity maps 800 and 900 of the respective holographic images will also shift back and forth in the horizontal direction. In one embodiment, a centroid shift probe beam pitch error signal may be derived from this back and forth horizontal shifting of, for example, "brighter" vertical stripes 828 and 928 of intensity maps 800 and 900, to adjust the probe beam pitch in order to Bragg-match the probe beam to the holograms. For example, an alternating probe angle wobble offset may be imparted to even numbered and odd numbered holograms which are then recovered, and the alternating horizontal intensity centroid shift detected by the horizontal back and forth shifting of vertical stripes 828 and 928 in intensity maps 800 and 900 used to derive a centroid shift probe beam pitch error signal. Also, while maps 800 and 900 represent the "wobbling" of different holograms, in other embodiments involving an iterative alignment procedure for one hologram, these maps may also represent different images of the same hologram.

In yet another embodiment, centroid shifts in the vertical, or x-direction (as opposed to the horizontal, or y-direction as described with reference to FIGS. 6 and 7 for probe beam pitch mismatch/misalignment) may be used to indicate a wavelength (or a holographic storage medium dimensional expansion or contraction) mismatch or misalignment. For example, again referring to FIG. 5, a wavelength mismatch/misalignment would be indicated graphically by changing the radius of k-sphere 502 and the length of wave vectors $\vec{k}_{P1}$ and $\vec{k}_{P2}$, while an isotropic media dimensional mismatch/misalignment (caused, for example, by expansion or contraction of the holographic storage medium) would be graphically indicated by a changing of the radius of curvature of polarization density patch 504. In either case, the curvature of k-sphere 502 would no longer match the curvature of polarization density patch 504, and thus polarization density patch 504 would "separate" from k-sphere 502 at the top and bottom edges, of patch 504 (these top and bottom edges are indicated and shown, respectively, as 534 and 536 in FIG. 5) when the best Bragg-matched part is in a horizontal locus across the middle of polarization density patch 504. Thus, the probe beam angle wobble may cause the locus of highest intensity (i.e., the best Bragg matched part) to shift vertically up and down, which may be detected as a vertical shift in the x-centroid of the detected intensity images.

Figure 10:
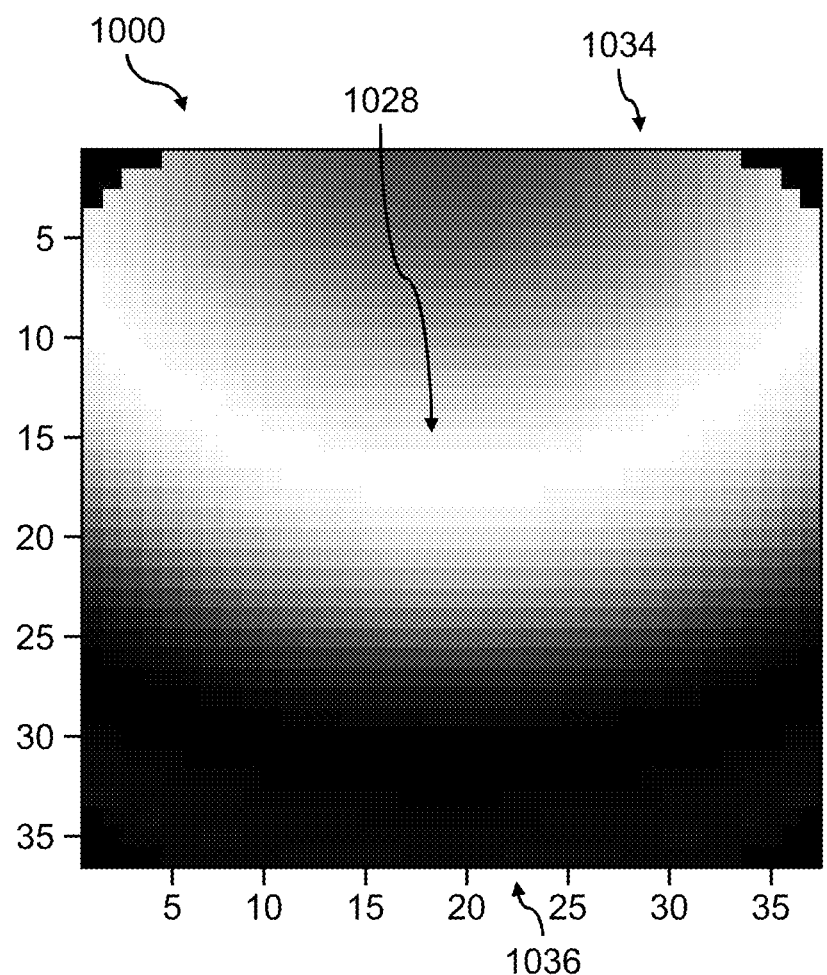
FIGS. 10 and 11 are images of intensity maps (36×37 sample grid) which, together, show a downward centroid shift of a "brighter" Bragg matched horizontal crescent-shaped band.
Figure 11:
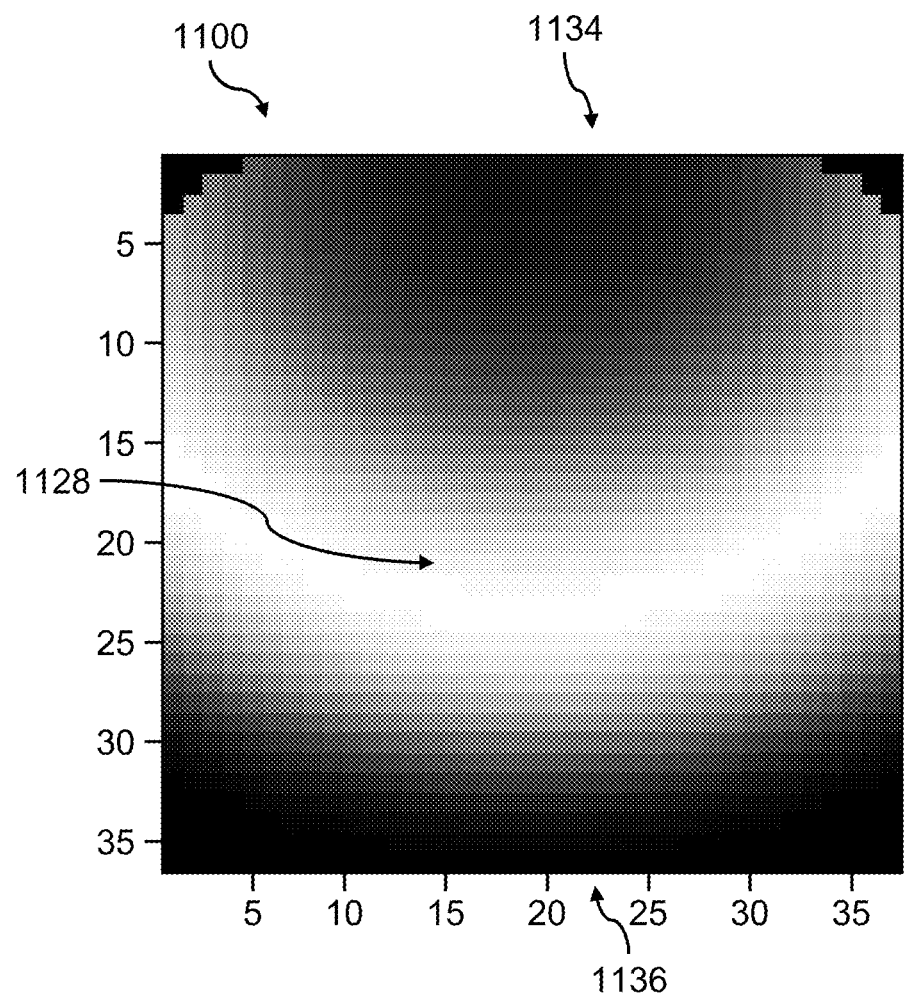

Similar to intensity maps 800 and 900 of FIGS. 8 and 9, the vertical up and down centroid shifts of patch 504 conceptually discussed with reference to FIG. 5 may be physically or visually detected, for example, by comparing intensity map 1000 (a 36×37 sample grid) of FIG. 10 and intensity map 1100 (also a 36×37 sample grid) of FIG. 11. As shown in FIGS. 10 and 11, the best Bragg matched parts of intensity maps 1000 and 1100 are represented, respectively, by "brighter," generally crescent-shaped horizontal bands 1028 and 1128. (Because of the changing radius of k-sphere 502 and the length of wave vectors $\vec{k}_{P1}$ and $\vec{k}_{P2}$, the best Bragg-match part of the corresponding patch 504 also assumes a generally curved or crescent shape, thus "brighter" horizontal bands 1028 and 1128 are generally crescent-shaped.) Again, as the probe beam angle is alternately wobbled, a Bragg-matched "brighter" horizontal generally crescent-shaped band of the holographic image shifts up and down in the x-(vertical) direction (see vector $\vec{k}_y$ in FIG. 5), thus causing a vertical shift of this generally "brighter" crescent-shaped horizontal band. The upper edge of map 1000, indicated as 1034, corresponds to upper edge 534 of patch 504, while the lower edge of map 1000, indicated as 1036, corresponds to lower edge 536 of patch 504. Similarly, the upper edge of map 1100, indicated as 1134, corresponds to upper edge 534 of patch 504, while the lower edge of map 1100, indicated as 1136, corresponds to lower edge 536 of patch 504. The effects of probe beam wavelength mismatch/misalignment conceptually discussed above with reference to FIG. 5 may thus be physically or visually detected by comparing the vertical up and down shifting of the "brighter" horizontal bands (i.e., 1028 and 1128) in maps 1000 and 1100. For example, as the probe beam angle is alternately wobbled, the best Bragg-matched horizontal band (i.e., 1028 and 1128) of intensity maps 1000 and 1100 of the respective holographic images will also shift up and down in the vertical direction. In one embodiment, a centroid shift probe beam wavelength error signal may be derived from this up and down vertical shifting of, for example, "brighter" horizontal bands 1028 and 1128 of intensity maps 1000 and 1100, to adjust the probe beam wavelength in order to Bragg-match the probe beam to the holograms. For example, an alternating angle wobble offset may be imparted to even numbered and odd numbered holograms which are then recovered, and the alternating vertical intensity centroid shift detected by the vertical up and down shifting of "brighter" horizontal bands 1028 and 1128 in intensity maps 1000 and 1100 used to derive a centroid shift probe beam wavelength error signal. In another embodiment, such intensity maps may be used to adjust the temperature of the holographic storage medium to Bragg-match the holograms to the probe beam.

In a similar manner to the centroid shifts in the y-(horizontal) direction (as illustrated by FIGS. 6 through 9), or the centroid shifts in the x-(vertical) direction (as illustrated by FIGS. 5, 10, and 11), centroid shifts in response to the holographic storage medium rotation, or rotation about an axis parallel to z-dimension vector $\vec{K}_z$ may also be detected. In fact, this operation does not actually distinguish between these two rotational components, but instead indicates a "zero" alignment error (i.e., no centroid shift) when the hologram is optimally Bragg-matched. Thus, a small medium rotation misalignment may be corrected by a small probe beam pitch change, and vice-versa. Furthermore, in a holographic data storage system or device, the optimal medium rotation angle/probe beam pitch settings may change within an angle-multiplexed hologram stack due to out-of-plane errors in the beam steering optics, etc. In one embodiment, one of these alignment control axes (for example, medium rotation) may be set to some nominal, invariant value for a hologram stack, and another control axis (for example, the probe beam pitch) may be adjusted in response to the centroid feedback error signal in order to optimize the Bragg-matching of each hologram.

Figure 12:
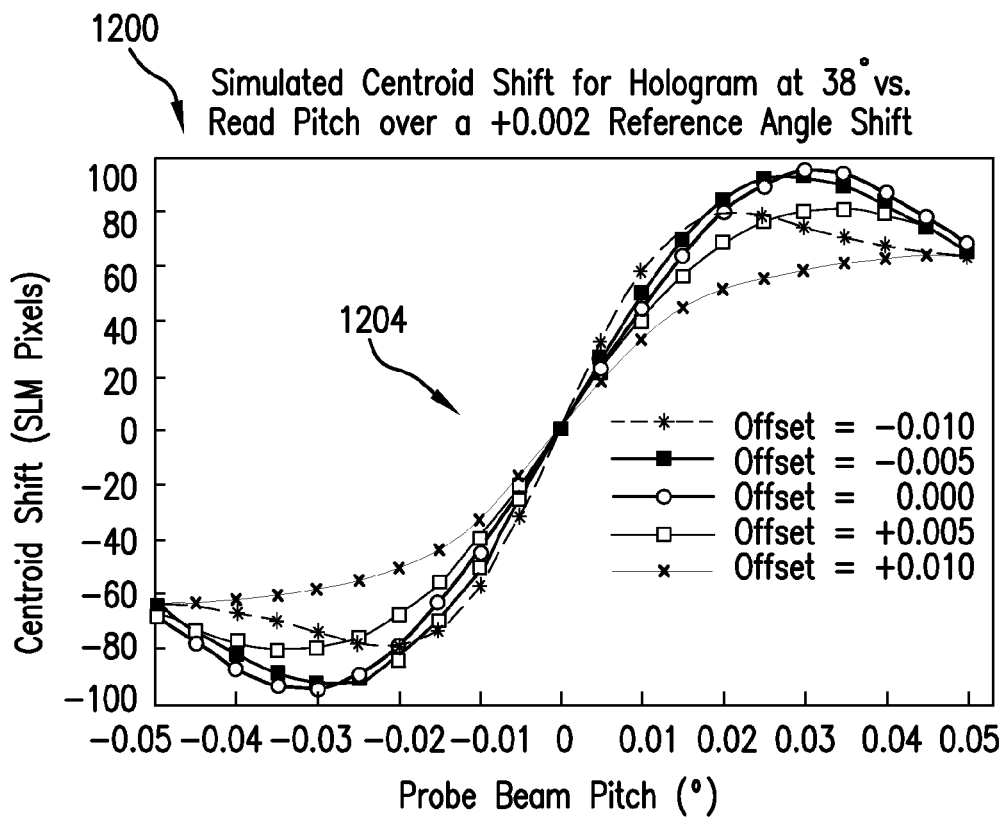
FIG. 12 shows graphical plots of curves of simulated intensity centroid shifts as a function of probe beam pitch in response to an alternating probe beam angle wobble of $\Delta\phi=\pm0.002°$ at several different probe beam angle offsets.
Figure 13:
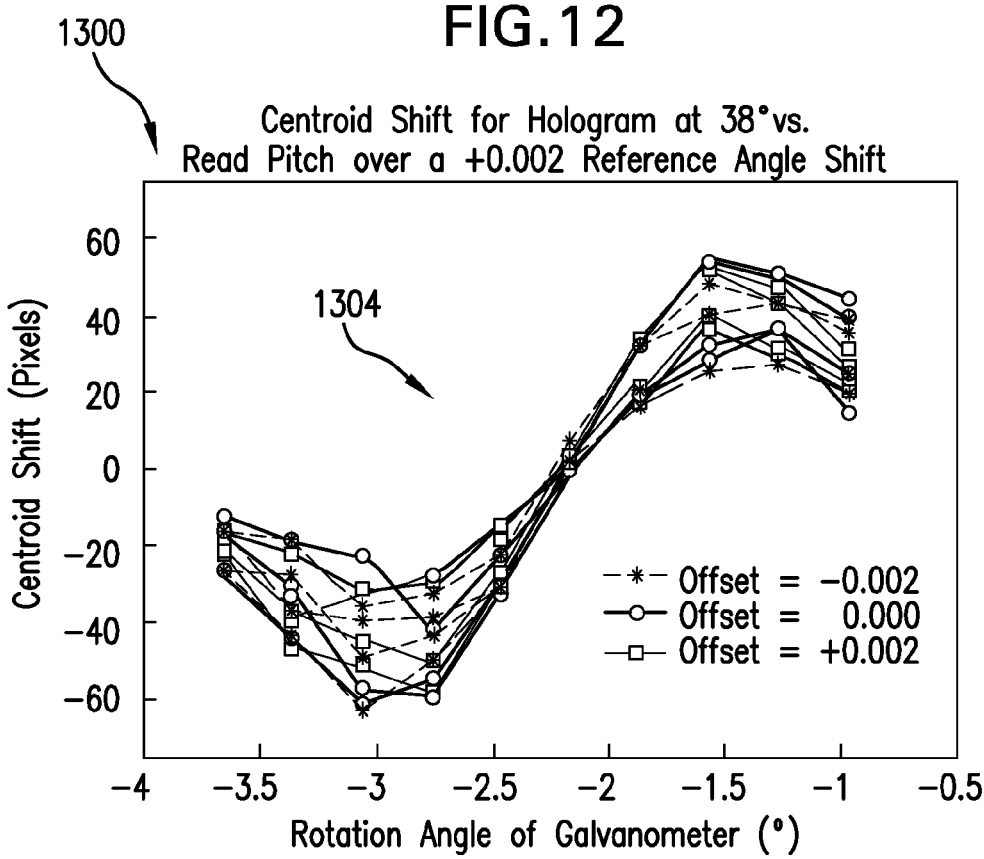
FIG. 13 shows graphical plots of curves of multiple test sets of experimental intensity centroid shifts as a function of probe beam pitch in response to an alternating probe beam angle wobble of $\Delta\phi=\pm0.002°$ at s several different probe beam angle offsets.

FIGS. 12 and 13 show, respectively, graphical plots indicated generally as 1200 and 1300, each of which comprise several curves of simulated and experimental intensity centroid shifts as a function of probe beam pitch in response to an alternating probe beam angle wobble of $\Delta\phi=\pm0.002°$. FIG. 12 shows five curves representing probe beam angle offsets (i.e., the starting probe beam angle error) of $-0.010°$, $0.005°$, $0.000°$, $+0.005°$, and $+0.010°$, while FIG. 13 shows multiple test sets with curves representing probe beam angle offsets (i.e., again indicating the starting probe beam angle error) of $-0.002°$, $0.000°$, and $+0.002°$. The linear section in the middle of each curve shown in FIGS. 1200 and 1300, and indicated, respectively, as 1204 and 1304, shows the region where the centroid shift signal is proportional to probe beam pitch, and thus may be used as a measurement of the misalignment of the probe beam pitch. The individual curves plotted in each of FIGS. 12 and 13 show the differing "offsets" in the center probe beam angle, thus indicating that the operation works even when the probe beam is not optimally aligned in Bragg angle.

Like the SNR-based feedback wobble error signals of section 1a above, the two holographic images (or intensity maps of those images) used to determine the intensity centroid shift may actually be two separate holograms. In one embodiment, an alternating probe beam angle wobble of $\Delta\phi=\pm0.002°$ may be used as the holograms in a stack are recovered in sequence, and independent control loops based on the SNR-based probe beam angle wobble error signal of section 1a and the centroid shift-based probe beam pitch error signal of this section are operated simultaneously to minimize the alignment error of both of these probe beam alignment control axes.

d. Cross-Correlation Derived Error Signals

In section 1c above, the probe beam pitch and probe beam wavelength misalignments may be determined by the differences in intensity centroid positions of the holographic images detected at two (alternating) probe beam angle offsets. In an alternative embodiment to detecting this difference between the two holographic images by this intensity centroid operation, a cross-correlation operation or a modified cross-correlation operation, may be performed. This cross-correlation (or modified cross-correlation) operation may be particularly useful in deriving a feedback error signal for a single hologram, as described below in the iterative alignment procedure of section 4.

In this alternative operation, a cross-correlation between the two holographic images (or between reduced-size, smaller intensity maps of the two images) is performed, followed by determining the location of the peak in the cross-correlation grid or matrix which indicates the offset position where the two images best match each other. For example, if the position of the "brighter" vertical stripe in the intensity map shifts to from the right (e.g., from the position where "brighter" vertical strip 828 is in intensity map 800 of FIG. 8), to the left (e.g. to the position where vertical strip 928 is in intensity map 900 of FIG. 9), the peak value in the cross-correlation between the two intensity maps (e.g. maps 800 and 900) will then appear as a negative offset, with its location in the y-(horizontal) direction being approximately equal to the amount of the horizontal shift of the intensity pattern from right to left. Similarly, a rightward shift in location of the cross-correlation peak (e.g., from the position where "brighter" vertical stripe 928 is shown in intensity map 900 of FIG. 9 to the position where "brighter" vertical strip 828 is shown in intensity map 800 of FIG. 8) will be indicated as a positive offset in the y-(horizontal) direction. Upward shifts (e.g., from the vertical position of "brighter" horizontal band 1128 in intensity map 1100 of FIG. 11 to the vertical position of "brighter" horizontal band 1028 in intensity map 1000 of FIG. 10), or downward shifts (e.g., from the vertical position of horizontal band 1028 in intensity map 1000 of FIG. 10 to the vertical position of horizontal band 1128 in intensity map 1100 of FIG. 11) in the intensity pattern may also be indicated by a positive (or negative) offset of the location of the cross-correlation peak in the x-(vertical) direction.

A modified version of this cross-correlation operation may be used in order to enhance accuracy and minimize computation. Like a standard cross-correlation operation, in this modified cross-correlation operation, the image intensity maps may be provided to the controller in the form of, for example, two 36×37 sample grids, wherein each element or value of each "pixel" of the grid corresponds to the summed intensity of the resampled 32×32 pixel tile within the detected image. The cross-correlation, $xc_{i,j}$, may then be computed by calculating the dot products of the D.C.-free versions of the two image intensity maps to provide, for example, a 3×3 cross-correlation grid or matrix.

But unlike the standard cross-correlation operation, the dot products of the modified cross-correlation are calculated at only the +1,0,−1 offset pixel locations (i.e., excluding the location 0,0) of the cross-correlation grid or matrix, i.e., by using the following Equation 13:

$$xc_{i,j} = \begin{cases} \sum_{r=1}^{36}\sum_{c=1}^{37} \tilde{M}_{r,c}\tilde{N}_{r+i,c+j} & i=-1\ldots+1, j=-1\ldots+1 \\ 0 & i=j=0 \end{cases} \quad (13)$$

wherein $\tilde{M}_{r,c}$ and $\tilde{N}_{r,c}$ are the D.C.-free versions of the image intensity maps, $M_{r,c}$ and $N_{r,c}$ (i.e., $$\tilde{M}_{r,c} = M_{r,c} - \frac{1}{36 \times 37} \sum_{i,j} M_{i,j},$$

etc for $\tilde{N}_{r,c}$ . . . ). The result of Equation 13 provides a 3×3 modified cross-correlation grid or matrix with (at most) 8 non-zero or "computed" values, corresponding to the outer 8 matrix elements of the 3×3 matrix. In this modified 3×3 cross-correlation matrix, the value of the center matrix element is not computed or calculated because it carries no information about the shift of the image. The "peak" of the resulting 3×3 matrix may then be located with a centroid calculation according to Equation 1 above. However, since this matrix may contain negative values, it may be advantageous to subtract the minimum value from each of the matrix elements in order to produce a matrix that is positive (or zero) before computing the centroid. In addition, cross-correlation grids or matrices larger than 3×3 may be obtained, for example, 4×4 grids/matrices, 5×5 grids/matrices, etc., up to 2n−1 by 2m−1, wherein n×m is the image intensity map size (here a 36×37 sample grid).

Figure 14:
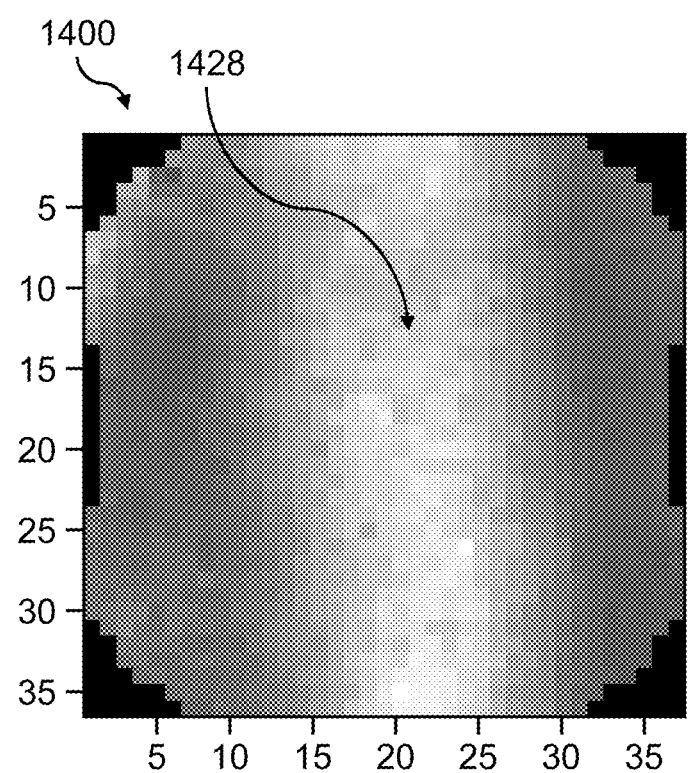
FIGS. 14 and 15 are images of intensity maps (36×37 sample grid) which, together, illustrate a right-to-left (leftward) intensity pattern shift, wherein each element of each sample grid corresponds to the summed intensity of a resampled 32×32 pixel tile.
Figure 15:
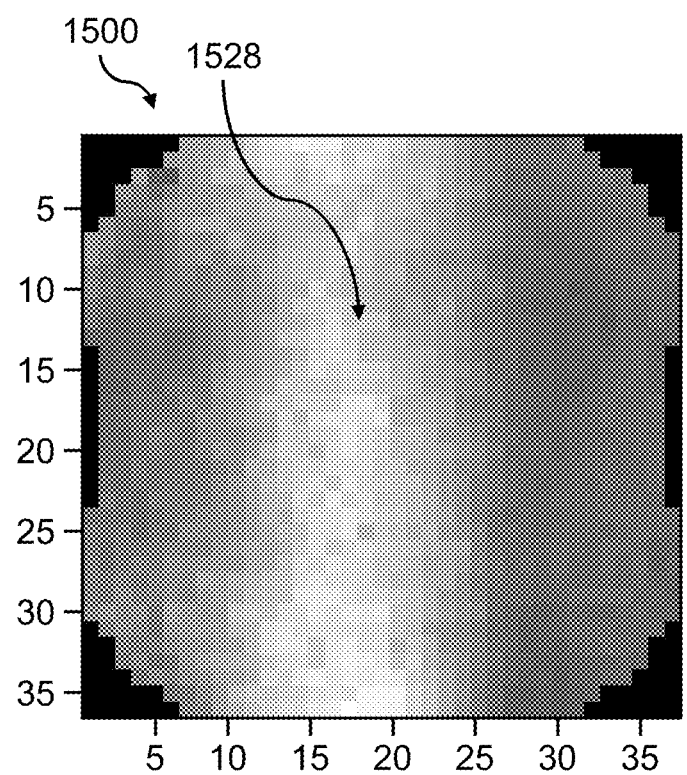
Figure 16:
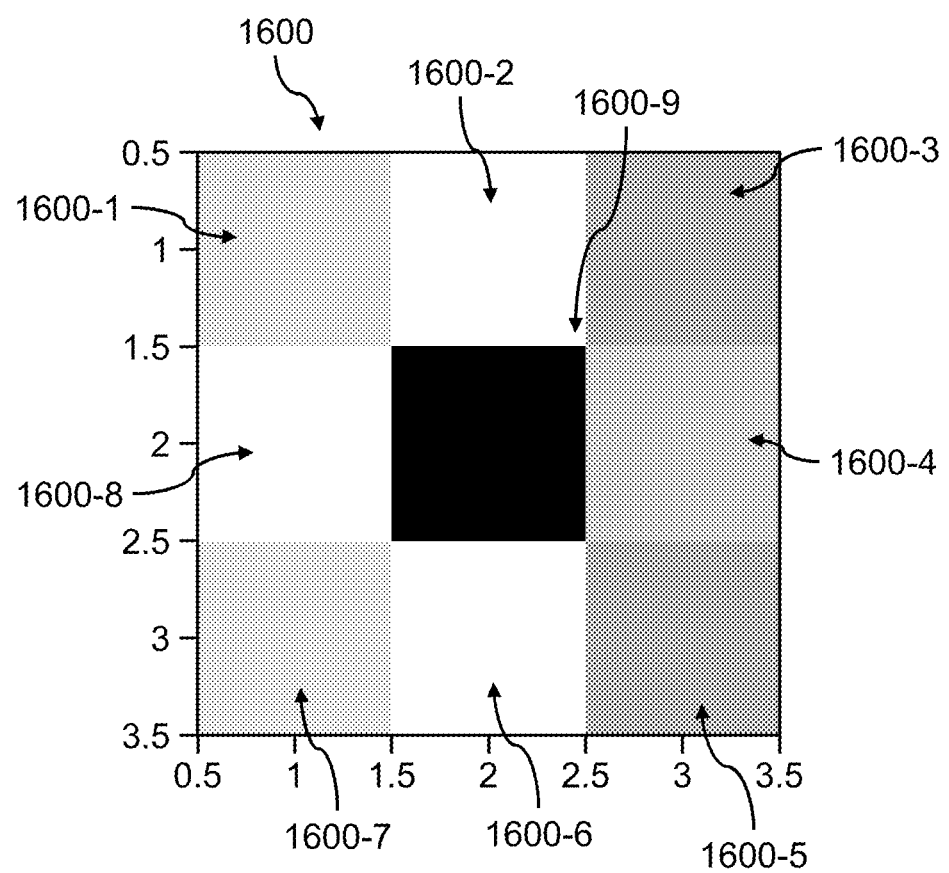
FIG. 16 is an image representing a 3×3 modified cross-correlation grid or matrix obtained as a product of the cross-correlation of the intensity maps of FIGS. 14 and 15.

This modified version of the cross-correlation operation is further illustrated by reference to FIGS. 14 through 19. FIGS. 14 through 16 represent the case of a modified cross-correlation involving horizontal (left-right) intensity pattern shifts. FIG. 14 is an image of an intensity map, indicated generally as 1400, for a 36×37 sample grid (as described above) illustrating a rightward intensity pattern shift (as indicated by "brighter" vertical stripe 1428). FIG. 15 is an image of an intensity map, indicated generally as 1500, for a 36×37 sample grid similar to that of intensity map 1400, but illustrating a leftward centroid shift (as indicated by brighter, vertical stripe 1528). The product of the cross-correlation of intensity maps 1400 and 1500 is represented in FIG. 16 by the 3×3 modified cross-correlation matrix, indicated generally as 1600. Outer white or gray-scale matrix elements 1600-1 through 1600-8 represent the 8 "non-zero" or "calculated" values described above, while the "dark" or "black" center matrix element 1600-9 represents the "non-calculated" value described above. The higher values of the matrix elements in the left-most column (i.e., "lighter" shaded elements 1600-1, 1600-8, and 1600-7), compared to the lower values of the matrix elements in the right-most column (i.e., "darker" shaded elements 1600-3, 1600-4, and 1600-5) show that image map 1400 correlates better with image map 1500 when image map 1400 is shifted to or towards the right, compared to when image map 1400 is shifted to or towards the left, thus quantitatively indicating a leftward shift of intensity map 1500 when compared to intensity map 1400.

Figure 17:
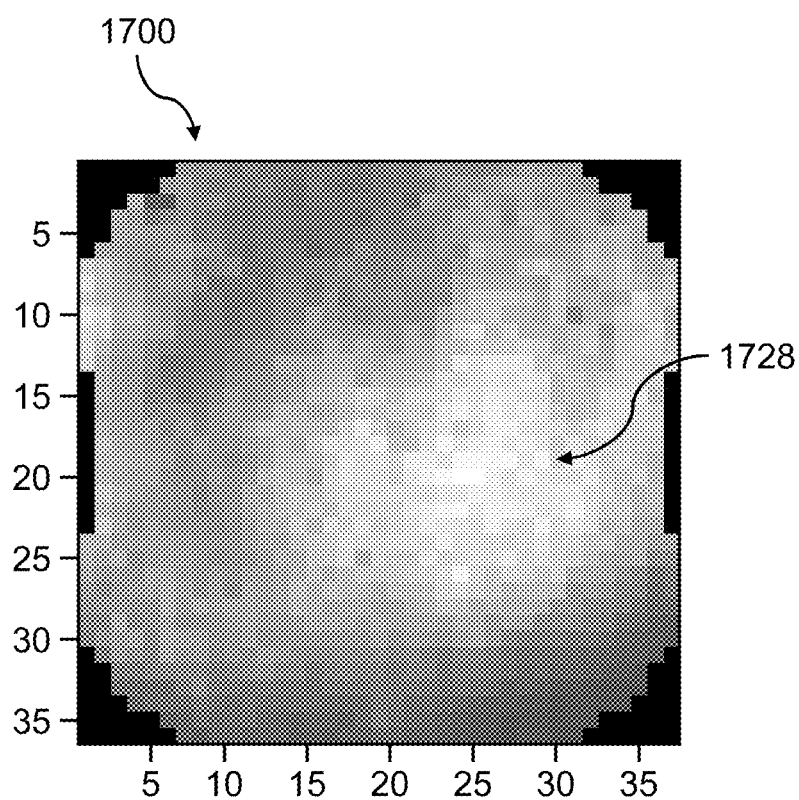
FIGS. 17 and 18 are images of intensity maps (36×37 sample grid) similar to those of FIGS. 14 and 15, but which, together, illustrate a downward intensity pattern shift.
Figure 18:
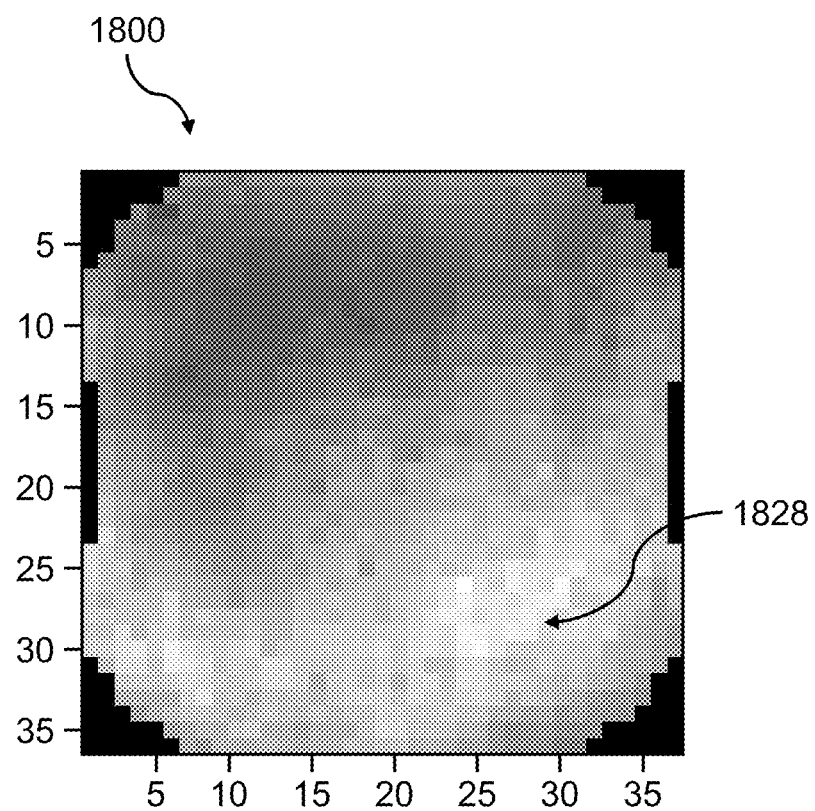
Figure 19:
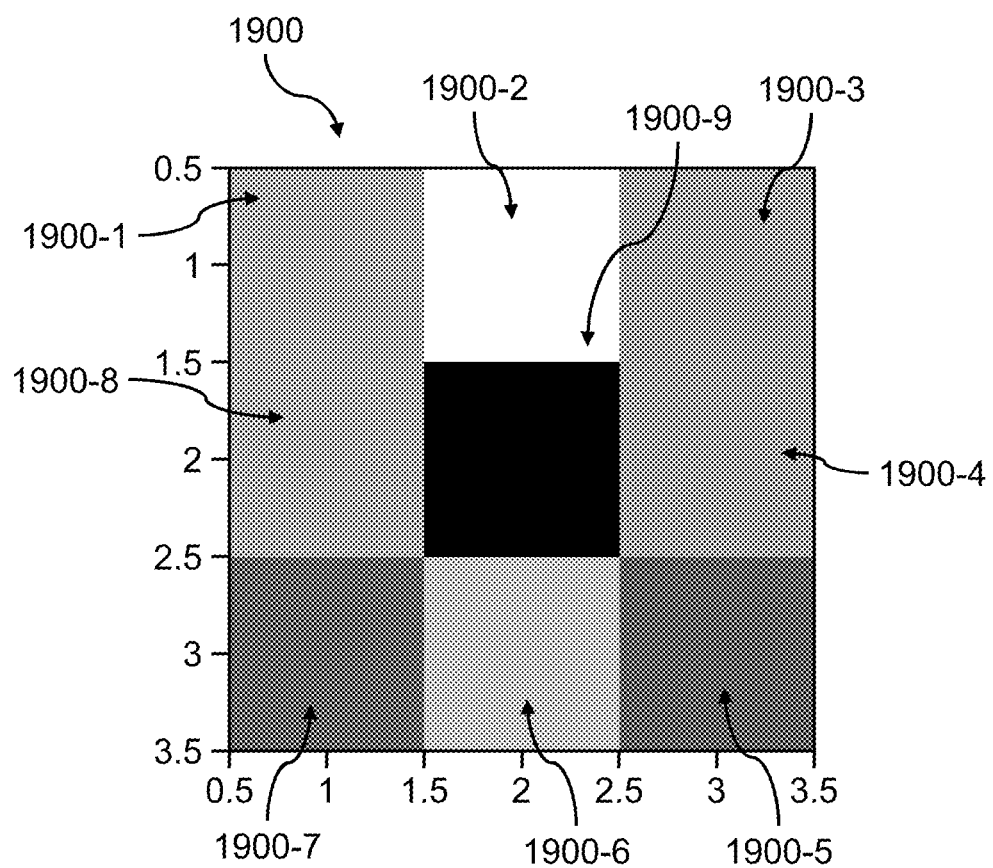
FIG. 19 is an image representing a 3×3 modified cross-correlation grid or matrix similar to that of FIG. 16, but obtained as a product of the cross-correlation of the intensity maps of FIGS. 17 and 18.

Similarly, FIGS. 17 through 19 represent the case of a modified cross-correlation involving vertical (upward-downward) intensity pattern shifts. FIG. 17 is an image of an intensity map, indicated generally as 1700, for a 36×37 sample grid similar to that of map 1400 or 1500 described above), but illustrating an upward intensity pattern location (as indicated by "brighter," horizontal band 1528). FIG. 18 is an image of an intensity map, indicated generally as 1800, for a 36×37 sample grid similar to that of intensity map 1700, but illustrating a downward intensity pattern location (as indicated by "brighter," horizontal band 1828). The product of the modified cross-correlation of intensity maps 1700 and 1800 is represented in FIG. 19 by the 3×3 modified cross-correlation matrix, indicated generally as 1900, and is similar to matrix 1600. Again, outer white or gray-scale matrix elements 1900-1 through 1900-8 represent the 8 "non-zero" or "calculated" values for the outer matrix elements described above, while "dark" or "black" center matrix element 1900-9 represents the "non-calculated" value for the center matrix element described above. The higher values of the matrix elements in the upper row (i.e., "lighter" shaded elements 1900-1, 1900-2, and 1300-3), compared to the lower values of the matrix elements in the lower row (i.e., "darker" shaded elements 1900-5, 1900-6, and 1600-7) show that image map 1700 correlates better with image map 1800 when image map 1800 is shifted upwardly, compared to when image map 1800 is shifted downwardly, thus quantitatively indicating an upward shift of intensity map 1800 when compared to intensity map 1700.

In poorly aligned initial conditions for the alignment control axes, the modified cross-correlation operation may perform better than the intensity centroid operation described in section 1c above because multiple hologram vertical stripes (or horizontal bands) may appear in a single image. As a result, the intensity centroid may actually move opposite the direction of the "true" hologram motion if one vertical stripe (e.g. 628) or hologram disappears off one edge (e.g., at 514), while a different vertical stripe (e.g., 728) or hologram enters or appears on the other or opposite edge (e.g., at 516).

2. Derivation of Feed-Forward Signals

Changes in recording and/or recovery operating conditions may also cause deterministic changes in optimal alignment for hologram recovery. In this case, detection of these recording and/or recovery operating conditions and an estimation of the required alignment adjustments may aid in the recovery of holograms. Such a feed-forward signal may be used alone, or, in one embodiment, in combination with one or more of the feedback error signal operations described above in section 1.

Figure 20:
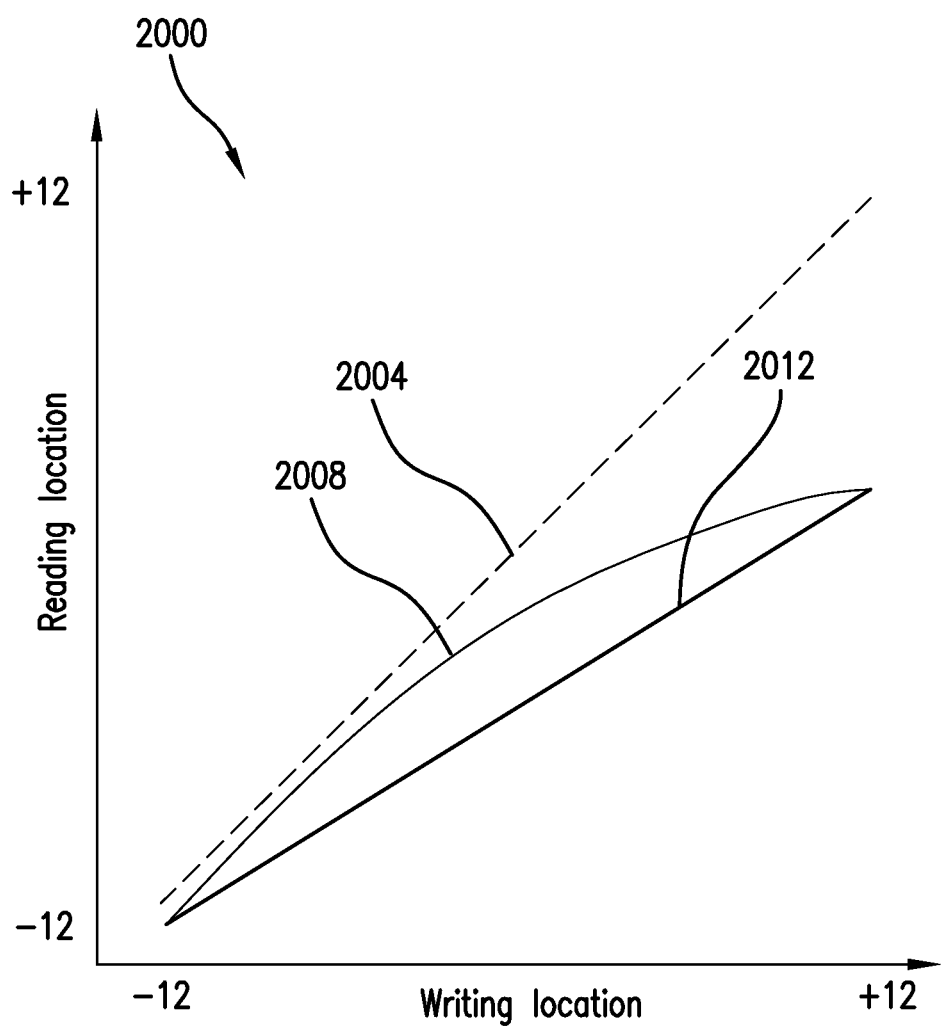
FIG. 20 shows a conceptual illustration of a deterministic angular displacement of the optimal probe beam angle for recovery of angle-multiplexed holograms which may occur due to expansion or contraction of the holographic storage medium between recording and recovering of the holograms.

FIG. 20 shows a conceptual illustration of a system, indicated generally as 2000, for determining the angular displacement of the optimal probe beam angles for the recovery of angle-multiplexed holograms which may arise as a consequence of expansion or contraction of the holographic storage medium (e.g., due to temperature changes, polymerization of the medium, etc.) between the recording and the recovery of the holograms, and/or a change in the wavelength of the probe beam compared to the reference beam used for recording the hologram(s). As shown in FIG. 20, the x-axis conceptually illustrates the angular writing (recording) locations of the holograms between −12° and +12°, while the y-axis conceptually illustrates the angular reading (recovery) locations of the holograms, also between −12° and +12° (wherein 0° for each axis indicates the center angle of the scanning range of the reference beam and probe beam, respectively). The upper straight dashed line 2004 conceptually illustrates a "perfect" or ideal hologram recovery system 2000 where there are no (or minimal) temperature changes (as well as no/minimal wavelength or other dimensional changes in the holograms) between the recording and recovery of the holograms. As a result, in an ideal hologram recovery system 2000, there is no (or minimal) angular shifting or displacement between the angular hologram recovery locations and the angular hologram recording locations in the holographic storage medium.

But often there are significant enough temperature differences between the recording and recovery of the holograms such that the holographic storage medium expands or contracts. As a result of this expansion (or contraction), the angular hologram recovery locations in the holographic storage medium are shifted or displaced relative to the angular hologram recording locations. In fact, thermal expansion (or contraction) of the holographic storage medium may cause a larger shift or displacement in the angular hologram recovery locations of the holograms recorded at higher reference beam angles versus at lower reference beam angles. This is conceptually illustrated in FIG. 20 by downwardly curved line 2008 which conceptually represents the actual angular hologram recovery locations for the holograms. (Line 2012 represents a linear interpolation of these recovery locations.) As further shown in FIG. 20, this shift or displacement between the actual angular recovery locations represented by curved line 2008, and the ideal angular recovery locations represented by line 2004, may be nearly or approximately quadratic over the entire angular probe beam range of the holograms.

Often, the displacement or shift of the angular hologram recovery locations is approximately linear with respect to the temperature change between recording and recovering holograms, so that this shift may be represented by Equation 14:

$$\Delta\phi_{ff}(\phi,\Delta T) \approx \Delta T(a\ \phi^2 + b\phi + c) \tag{14}$$

wherein $\Delta\phi_{ff}(\phi, \Delta T)$ is the feed-forward angular recovery displacement as a function of the probe beam angle $\phi$, $\Delta T = T_R - T_W$ is the difference in temperature between the read (recovery) and write (record) operations, and a, b, and c are regression constants established either experimentally or by opto-mechanical modeling.

Thus, if the temperature change can be established by the use of a thermometer or other temperature sensor, the feed-forward angular displacement for each hologram recovery location may be predicted in advance and incorporated into the control system compensation algorithm as a feed-forward signal. The temperature change may be established by measuring and recording the write (record) temperature ($T_W$), and then subtracting the write temperature from the read (recovery) temperature ($T_R$). Alternatively, the temperature measured at writing (recording) time may be used to pre-compensate the reference beam angles and writing (recording) wavelength to make the hologram stack appear as though it had been written (recorded) at some standard temperature, wavelength, hologram spacing, etc., thus providing a predetermined pre-compensation recording temperature for each recorded hologram. Then, the effective $\Delta T$ may be established by simply measuring the temperatures during the read (recovery) operation and subtracting the predetermined pre-compensation recording temperature for each recovered hologram.

The difference in wavelength, $\Delta\lambda$, between the probe beam and the writing (recording) beam has a similar, predictable effect on the angular displacement for each hologram recovery location. By including $\Delta\lambda$, along with $\Delta T$ and $\phi$, this angular recovery displacement for each hologram recovery location may be represented by a quadratic equation according to Equation 15:

$$\Delta\phi_{ff}(\phi,\Delta T,\Delta\lambda) = (A\Delta T + B\Delta\lambda)\phi^2 + (C\Delta T + D\Delta\lambda)\phi + E\Delta T + F\Delta\lambda \tag{15}$$

wherein the angular recovery displacement $\Delta\phi_{ff}(\phi, \Delta T, \Delta\lambda)$ is now a function of $\Delta\lambda$ as well as $\phi$ and $\Delta T$. In an exemplary configuration, the fitting constants may, for example, have values A=−8.843658×10$^{-6}$; B=6.071955×10$^{-5}$; C=2.786626×10$^{-4}$; D=−2.642586×10$^{-3}$; E=−4.583689× 10$^{-3}$; and F=1.020074×10$^{-1}$, wherein $\phi$ is measured in degrees from the medium normal, $\Delta T$ is in ° C., and $\Delta\lambda$ is in nanometers (nm).

3. Control System Compensation Algorithm

The embodiments of the present operations or methods for generating feedback error and feed-forward signals may be used with, for example, conventional control system techniques in order to achieve a method for adaptively adjusting one or more alignment control axes while reading (recovering) holograms in a sequence of holograms. For example, probe beam angle feedback alignment may resemble a phase locked loop, wherein a servo control system may be used to align an oscillator to a (quasi) cyclical signal. In this case, the probe beam recovery angles may be aligned to the actual angular recovery positions of the holograms.

Various applicable techniques for the design and analysis of control systems may be used in embodiments of the present invention. See R. C. Dorf, *Modern Control Systems*, (Third Edition, Addison-Wesley Publishing (1983), the entire contents and disclosure of which is hereby incorporated by reference. In one such example, a proportional-integral-derivative (PID) controller may be adapted for use, e.g., according to Equation 16:

$$\hat{\phi}_{h+1} = K_P err_h + K_I \sum_{i=1}^{h} err_i + K_D(err_h - err_{h-1}) + (h+1)D \tag{16}$$

wherein the $\hat{\phi}_h$ are the estimated hologram angles (i.e., without any wobble), h is the hologram number, $K_P$, $K_I$, and $K_D$ are the proportional, integral, and differential control constants, respectively; D is the nominal spacing between the holograms, and $err_h$ are the observed error samples. Different linear control forms may also be used, as might approaches based on fuzzy logic or other non-linear methods.

In another embodiment, a compensator based on a state estimation method, such as a Kalman filter, may be used. In one embodiment, the state estimation may be based on a recursive least squares (RLS) filter. In this approach, the state of the system may be parameterized into some mathematical form, and the RLS algorithm may be used to derive the coefficients for the state parameters that minimize the sum of squared errors between the parameterized model and the observations. In one embodiment, the parameterized model may be a simple straight line wherein the x-axis represents the hologram number, and the y-axis represents the optimal recovery angle for each hologram. Thus, the RLS algorithm may be used iteratively to determine the slope a and intercept b of the line best fitting the observed hologram positions according to Equation 17:

$$\hat{\phi}_h = a\ h + b \text{ where } \Sigma[\hat{\phi}_h - (\phi_h + err_h)]^2 \text{ is minimized} \tag{17}$$

wherein the $\hat{\phi}_h$ are the RLS estimated hologram angles, h is the hologram number, and $(\phi_h + err_h)$ are the observed hologram angles. The RLS algorithm may efficiently update the values of a and b every time a new error observation, $err_h$, is made so that the least-squares (LS) relationship may be maintained over the entire set of observations. In an embodiment of the present method, the RLS algorithm may be implemented with a "forgetting factor," $\phi\lambda$, (which is different from the symbol for wavelength above) which causes the most recent observations to be weighted more heavily, and the influence of past observations to be diminished by $\lambda$ at every iteration (i.e., $$\sum_{h=1}^{n} \lambda^{n-h}[\hat{\phi}_h - (\phi_h + err_h)]^2$$

is minimized). This may aid in the accuracy of the predicted or estimated values in the case where the actual hologram positions deviate from the parameterized model over longer sequences of holograms.

In addition to improved accuracy and immunity to noise in the error signal, this form of the RLS compensator may have the advantage of decoupling the estimation process from the observation process. Thus, the state variables a and b may be updated whenever a new observation is available, and the estimation of future hologram positions may be made whenever required. Thus, in a "pipe-lined architecture" (i.e., where different stages of the image processing electronics are working on different images at the same time) wherein the SNR of a given hologram is not available until several subsequent hologram exposures have been performed, the positions for the subsequent holograms may be determined using the available values of a and b without waiting for the SNR of the given hologram. The latency between estimation and observation need not even be constant, the only consequence being that the quality of the estimates may degrade slowly as the latency increases.

Figure 21:
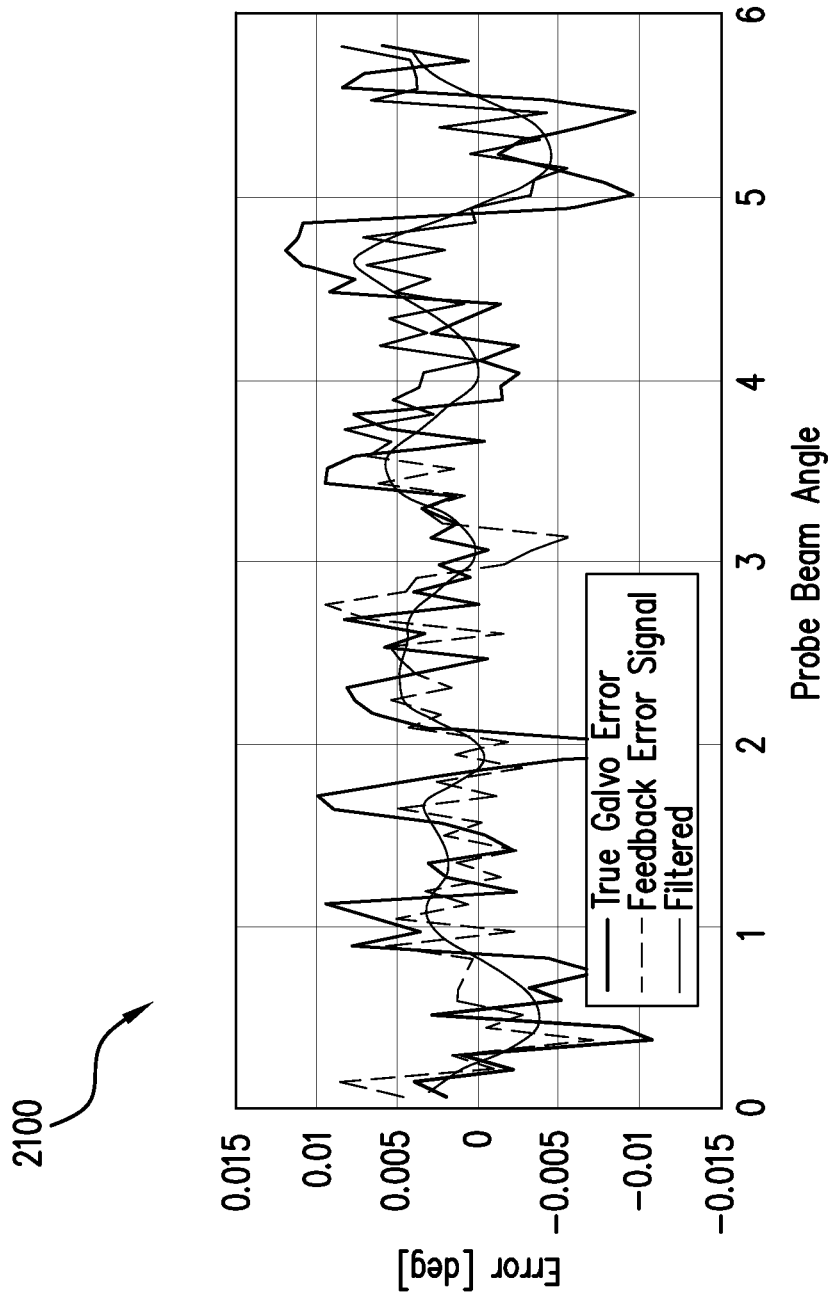
FIG. 21 is a graphical plot of a wobble error signal during a closed-looped operation.

FIG. 21 is a graphical plot, indicated generally as 2100, which illustrates the wobble error signal, $err_h$, generated during a simulated closed-loop operation on the hologram stack of FIG. 1 using a RLS compensator. The "bolder" line (True Galvo Error) shows the true error (i.e., the angular distance or displacement from the optimal recovery positions), with the alternating wobble evident as a high-frequency component. The "dashed" line (Feedback Error Signal) shows the estimate of the true error, as measured by the wobble method. The remaining line (Filtered) shows a low-pass filtered version of the feedback error signal. Since the system is actively correcting the error, the low frequency components evident in FIG. 1 have been largely eliminated. The maximum excursion from optimal has been roughly halved, greatly improving the SNR of the recovered holograms, which falls off approximately quadratically with the error. As shown in FIG. 21, the average SNR of the hologram stack recovered at the optimal positions is 4.86 dB, and the average SNR recovered using the algorithm is 4.75 dB. The average SNR loss is thus only 0.11 dB, which is a typical figure in testing.

Figure 22:
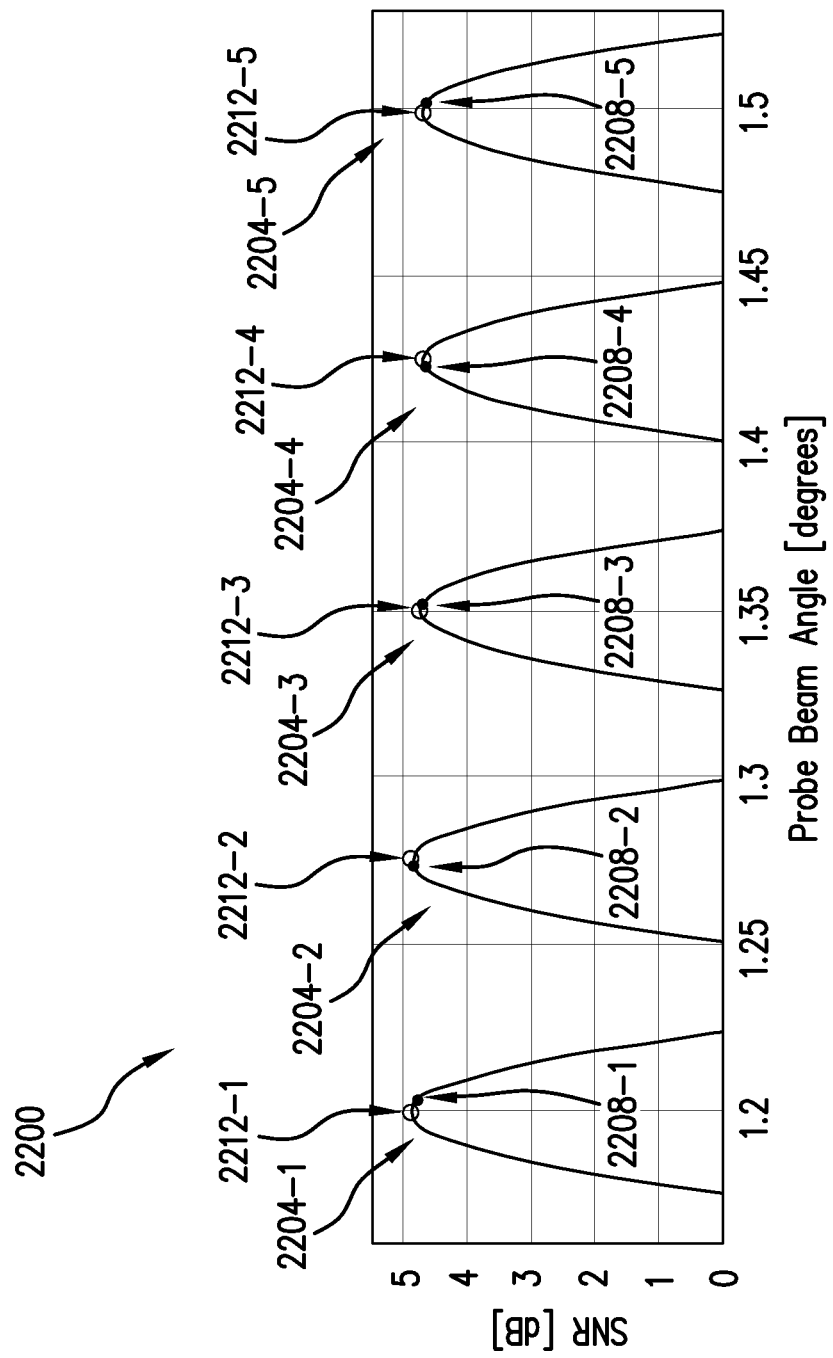
FIG. 22 is a graphical plot from the simulated operation of FIG. 21 showing wobble sampling between sample positions (red dots) and true peak SNR (green circles).

FIG. 22 is a graphical plot, indicated generally as 2200, which shows a portion of the angular positions generated during the simulated operation shown in FIG. 21 superimposed on the SNR peaks (indicated as 2204-1, 2204-2, 2204-3, 2204-4, and 2204-5). The wobble is discernable as the difference between the sample positions (indicated as black dots 2208-1, 2208-2, 2208-3, 2208-4, and 2208-5) and the true peak SNR (indicated as open circles 2212-1, 2212-2, 2212-3, 2212-4, and 2212-5). As the error is near zero in this region, and as shown in FIG. 22, the wobble is manifested as the sample position alternates slightly from the right side (as indicated, for example, by sample position 2208-1 for odd SNR peaks such as 2204-1) to the left side (as indicated, for example, by sample position 2208-2 for even SNR peaks such as 2204-2) of the SNR peaks.

Feed-forward information such as the temperature/wavelength displacement curve of Equation 15 above may also be incorporated to improve the accuracy of the position estimates. Feed-forward signals may be generally accommodated using various established techniques of control systems, just as with feedback signals. In one embodiment, the feed-forward component(s) may be removed before application of the feedback loop, and then restored afterwards, e.g., such as according to Equation 18:

$$\phi'_h = \phi_h - \Delta\phi_{\mathit{ff}}(\phi_h, \Delta T, \Delta\lambda),$$

$$\phi'_{h+1} = ah + b,$$

$$\phi_{h+1} = \phi'_{h+1} + \Delta\phi_{\mathit{ff}}(\phi_{h+1}, \Delta T, \Delta\lambda). \qquad (18)$$

In this manner, the known quadratic components introduced by the $\Delta\phi_{\mathit{ff}}(\phi, \Delta T, \Delta\lambda)$ displacement of Equation 14 may be removed from the RLS algorithm, which fits the remaining components to its linear model within the $\phi'$ coordinate system. The quadratic components may then be restored after the fact in the true $\phi$ coordinate system. This may be implemented by analytical solution of Equation 15 above, either dynamically or by using a pre-computed look-up table.

4. Iterative Alignment Procedure for Single Hologram

The embodiments of the present operations or methods may also use feedback error signal(s) to adjust the alignment control axes to or towards a sufficiently optimal recovery position for a single hologram. In these embodiments, the feedback error signal(s) may be derived from one or more iterations of an iterative alignment error value procedure using the single hologram in order to achieve a sufficiently precise alignment (relative to, for example, a threshold alignment error criteria) for use in recovery of the single hologram at a sufficiently optimal recovery position of the specific hologram. In other words, these embodiments use what is referred to herein as an iterative alignment procedure with reference to the single hologram to derive the feedback error signal(s).

One embodiment of this iterative alignment procedure is described as follows. The three probe beam alignment control axes—probe beam angle ($\phi$), probe beam pitch ($\rho$), and probe beam wavelength ($\lambda$)—may be initialized to starting positions referred to, for example, as $\phi_0$, $\rho_0$, and $\lambda_0$, which represent, for example, the best guess as to the optimal recovery position of the particular hologram. A "positive" offset of $+\Delta\phi$ is then applied or imparted to angle $\phi$ and a first holographic image exposure is then taken or sampled; similarly a "negative" offset of $-\Delta\phi$ is applied or imparted to angle $\phi$ and a second holographic image exposure is then taken or sampled. The alignment error value in angle $\phi$ ("$err_\phi$") is then determined by Equation 19:

$$err_\phi = k_\phi(SNR_2 - SNR_1) \qquad (19)$$

wherein $k_\phi$ is a scaling constant (empirically derived or by modeling for the particular system), and $SNR_1$ and $SNR_2$ are the signal-to-noise ratios measured from first and second holographic image exposures, respectively. The alignment error value in pitch $\rho$ ("$err_\rho$") may determined by Equation 20:

$$err_\rho = k_\rho(CY_2 - CY_1) \qquad (20)$$

wherein $k_\rho$ is a scaling constant (empirically derived or by modeling for the particular system), and $CY_1$ and $CY_2$ are the intensity centroids for first and second holographic image exposures in the y (horizontal) direction, vector $\vec{k}_y$, (i.e., transverse to the direction of Bragg selectivity) determined from the first and seconds holographic image exposures, respectively. The alignment error value in wavelength $\lambda$ ("$err_\lambda$") is determined by Equation 21:

$$err_\lambda = k_\lambda(CX_2 - CX_1) \qquad (21)$$

wherein $k_\lambda$ is a scaling constant (empirically derived or by modeling for the particular system), and $CX_1$ and $CX_2$ are the intensity centroids in the x (vertical) direction, vector $\vec{k}_x$, (i.e., longitudinal to the direction of Bragg selectivity) determined from the first and seconds holographic image exposures, respectively. Then, all three axes positions may be adjusted in a manner which reduces the alignment error, e.g., $\phi_1 = \phi_0 - err_\phi$, $\rho_1 = \rho_0 - err_\rho$, and $\lambda_1 = \lambda_0 - err_\lambda$.

The iterative alignment procedure may be repeated by using the new probe beam alignment control axes positions as the "new" starting positions. At the completion of each iteration, the alignment error values may be checked. If a settling or "threshold" criteria is met or satisfied (e.g., the magnitude each error sample is equal to or less than a predetermined threshold alignment error criteria), then alignment may be deemed to be achieved and the iterative alignment procedure may then be terminated. Optionally, the iterative alignment procedure may be repeated for a fixed or predetermined number of times (cycles) before terminating the iterative procedure. Also optionally, a final aligned holographic image exposure (without a $\pm\Delta\phi$ offset) may be taken to evaluate the alignment, or to actually recover the data.

Many variations on the above iterative alignment procedure may be used. In one variation, image intensities may be used instead of SNRs in the calculation of $err_\phi$. This may be desirable if SNRs for the hologram(s) are not available, as may often be the case with a relatively poor starting alignment. In another variation, alignment values from repeated measurements may be averaged within each iteration of the respective alignment control axis. In yet another variation, a modified cross-correlation operation (as described in section Id above) may be used instead of a centroid shift operation (as described in section 1c above) in order to determine $err_\rho$ and/or $err_\lambda$.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method comprising the following steps:
   (a) in a holographic data storage system or device, providing a sequence of recorded holograms including a next hologram in the sequence to be recovered; and
   (b) adjusting at least one alignment control axis of the holographic data storage system or device to or towards a sufficiently optimal recovery position for recovery of the next hologram by the holographic data storage system or device based on a derived feedback error signal; wherein the feedback error signal is for adjusting at least one alignment control axis and is derived by the following steps: (i) imparting a wobble offset to one or more control axis alignments while sampling one or more holograms; (ii) using alignment-indicating data from sampling the one or more holograms to determine any misalignment in at least one control axis; and
   wherein the derived feedback error signal estimates a direction and magnitude of misalignment of the at least one alignment control axis for the next hologram based on alignment-indicating data for the one or more previously recovered holograms.

2. The method of claim 1, wherein the at least one alignment control axis includes at least one probe beam alignment control axis.

3. The method of claim 2, wherein the at least one probe beam alignment control axis is selected from one or more of a probe beam angle, a probe beam wavelength, and a probe beam pitch.

4. The method of claim 3, wherein the at least one probe beam alignment control axis is at least the probe beam angle.

5. The method of claim 3, wherein the at least one probe beam alignment control axis is at least the probe beam wavelength.

6. The method of claim 3, wherein the at least one probe beam alignment control axis is at least the probe beam pitch.

7. The method of claim 3, wherein the at least one probe beam alignment control axis is selected from two or more of the probe beam angle, the probe beam wavelength, and the probe beam pitch.

8. The method of claim 1, wherein after step (i), using alignment-indicating data from sampling the one or more holograms to determine any misalignment in the at least one probe beam alignment control axis between the one or more holograms; and (iii) for any misalignment determined in step (ii), using the determined misalignment to provide the feedback error signal.

9. The method of claim 8, wherein an alternating wobble offset is imparted during step (i).

10. The method of claim 9, wherein the at least one probe beam alignment control axis is the probe beam angle, wherein the alternating wobble imparted during step (i) is an angle wobble offset, and wherein the feedback error signal provided in step (iii) is a wobble angle feedback error signal.

11. The method of claim 10, wherein the alignment-indicating data used in step (ii) is SNR data.

12. The method of claim 11, wherein the SNR data is measured from embedded bit patterns in the sampled one or more even numbered and odd numbered holograms.

13. The method of claim 10, wherein the alignment-indicating data used in step (ii) is diffracted beam intensity data.

14. The method of claim 9, wherein the alternating wobble offset imparted is up to about ±0.002°.

15. The method of claim 1, wherein the at least one alignment control axis is the probe beam angle and wherein the feedback error signal is derived based on measuring any distortions in holographic images caused by Bragg-mismatching between optimal and actual probe beam angles for the one or more recovered holograms in the sequence.

16. The method of claim 15, wherein the feedback error signal is derived by the following steps: (i) extracting a quiver pattern from the measured distortions in the holographic images of the one or more recovered holograms in the sequence; (ii) extracting a magnitude and sign of any characteristic Bragg misalignment quiver pattern from within the quiver pattern extracted in step (i) to determine any probe beam angle deviation; and (iii) using any determined probe beam angle deviation from step (ii) to provide the feedback error signal.

17. The method of claim 1, wherein the feedback error signal is derived by imparting wobble to one or more holograms.

18. The method of claim 17, wherein the feedback error signal is derived by imparting wobble to the one or more holograms to provide holographic images having an intensity pattern shift.

19. The method of claim 18, wherein the feedback error signal is derived by the following steps: (i) imparting an alternating angle wobble offset to one or more even numbered and odd numbered holograms from the one or more previously recovered holograms to cause an alternating intensity centroid shift between holographic images from the one or more even numbered and odd numbered holograms; (ii), after step (i), measuring the alternating intensity centroid shift between the holographic images sampled from the one or more even numbered and odd numbered holograms to determine any misalignment in one or more of probe beam wavelength and probe beam pitch between the sampled one or more even numbered and odd numbered holograms; and (iii) for any misalignment determined in step (ii), using the determined misalignment to provide the feedback error signal.

20. The method of claim 19, wherein any misalignment in the probe beam pitch is detected by a horizontal shift in the alternating intensity centroid shift between the holographic images of the sampled one or more even numbered and odd numbered holograms, and any misalignment in the probe beam wavelength is detected by a vertical shift in the alternating intensity centroid shift between the holographic images of the sampled one or more even numbered and odd numbered holograms.

21. The method of claim 19, wherein the feedback error signal is provided in step (iii) as a probe beam pitch error signal.

22. The method of claim 19, wherein the feedback error signal is provided in step (iii) as a probe beam wavelength error signal.

23. The method of claim 19, wherein the feedback error signal is provided in step (iii) as a probe beam pitch error signal and a probe beam wavelength error signal.

24. The method of claim 18, wherein the feedback error signal is derived by the following steps: (i) imparting wobble to one or more holograms to provide two holographic images having the intensity pattern shift; (ii), after step (i), performing a cross-correlation operation between: (1) the two holographic images; or (2) intensity maps of the two holographic images to provide a cross-correlation peak; (iii) from the cross-correlation operation performed in step (ii), determining the optimum location of the cross-correlation peak; and (iv) using the determined optimum cross-correlation peak to provide the feedback error signal.

25. The method of claim 24, wherein the optimum location of the cross-correlation peak location is determined during step (iii) by detecting the x,y-centroid of the cross-correlation operation of step (ii).

26. The method of claim 25, wherein the cross-correlation operation of step (ii) comprises calculating dot products of the D.C.-free versions of the image intensity maps of the two holographic images to provide a cross-correlation matrix, and wherein the optimum location of the cross-correlation peak is determined during step (iii) by using the cross-correlation matrix.

27. The method of claim 26, wherein the cross-correlation matrix comprises a modified cross-correlation matrix.

28. The method of claim 27, wherein the modified cross-correlation matrix comprises a 3×3 modified cross-correlation matrix having one center matrix element and eight outer matrix elements, and wherein a value for the center matrix element is not calculated, and wherein values for each of the eight outer matrix elements are calculated.

29. The method of claim 1, wherein the alignment control axis is hologram shift positions and wherein the feedback error signal is derived by the following steps: (i) imparting an alternating shift position wobble offset to recovery positions of one or more holograms; (ii) after step (i), using alignment-indicating data from sampling the one or more recovered holograms to determine any misalignment in hologram shift positions; and (iii) for any misalignment determined in step (ii), using the determined misalignment to provide the feedback error signal for correcting hologram shift positions.

30. The method of claim 1, wherein the alignment control axis is hologram exposure timing and wherein the feedback error signal is derived by the following steps: (i) imparting an alternating timing wobble offset to a sampling interval for a holographic storage medium having the sequence recorded thereon and which is shifting at a velocity; and (ii) after step (i), using alignment-indicating data from sampling the one or more recovered holograms to determine any misalignment in hologram exposure timing; and (iii) for any misalignment determined in step (ii), using the determined misalignment to provide the feedback error signal to correct for hologram exposure timing.

31. The method of claim 1, wherein the alignment control axis is wavelength tuning and wherein the feedback error signal is derived by the following steps: (i) imparting an alternating wavelength wobble offset to the wavelength of one or more probe beams used to recover the one or more holograms; (ii), after step (i), using alignment-indicating data from sampling the one or more recovered holograms to determine any misalignment in the wavelength tuning; and (iii) for any misalignment determined in step (ii), using the determined misalignment to provide the feedback error signal for wavelength tuning.

32. The method of claim 1, wherein step (b) comprises inputting the derived feedback error signal to a control system compensation algorithm to provide one or more control axis commands for adjusting the at least one alignment control axis.

33. The method of claim 32, wherein the one or more control axis commands are generated by a control processor.

34. A method comprising the following steps:
(a) in a holographic data storage system or device, providing a sequence of recorded holograms including one or more previously recovered holograms and a next hologram in the sequence to be recovered;
(b) based on alignment-indicating data for the one or more previously recovered holograms, deriving a feedback error signal which estimates a direction and magnitude of misalignment of at least one alignment control axis for the one or more previously recovered holograms;
(c) based on recording and recovery operating condition data for one or more holograms in the sequence, deriving a feed-forward signal which estimates an optimal alignment value for the at least one alignment control axis for the one or more holograms in the sequence; and
(d) adjusting the at least one alignment control axis of the holographic data storage system or device to or towards a sufficiently optimal recovery position for recovery of the next hologram by the holographic data storage system or device based on the derived feedback error signal of step (b) or the derived feed-forward signal of step (c).

35. The method of claim 34, wherein the at least one alignment control axis is selected from one or more of a probe beam angle, a probe beam wavelength, and a probe beam pitch.

36. The method of claim 35, wherein the feedback error signal of step (b) is derived by the following steps: (i) imparting an alternating wobble to one or more even numbered and odd numbered holograms from the one or more previously recovered holograms; (ii), after step (i), using alignment-indicating data from sampling the one or more even numbered and odd numbered holograms to determine any misalignment in the at least one probe beam alignment control axis between the one or more even numbered and odd numbered holograms; and (iii) for any misalignment determined m step (ii), using the determined misalignment to provide the feedback error signal.

37. The method of claim 36, wherein the at least one probe beam alignment control axis is the probe beam angle, wherein the alternating wobble imparted during step (i) is a wobble offset angle, and wherein the feedback error signal provided in step (iii) is a wobble angle feedback error signal.

38. The method of claim 37, wherein the alignment-indicating data used in step (ii) is SNR data.

39. The method of claim 35, wherein the feedback error signal of step (b) is derived by the following steps: (i) imparting an alternating angle wobble offset to one or more even numbered and odd numbered holograms from the one or more previously recovered holograms to cause an alternating intensity centroid shift between holographic images from the one or more even numbered and odd numbered holograms; (ii), after step (i), measuring the alternating intensity centroid shift between the holographic images sampled from the one or more even numbered and odd numbered holograms to determine any misalignment in one or more of the probe beam wavelength and the probe beam pitch between the sampled one or more even numbered and odd numbered holograms; and (iii) for any misalignment determined in step (ii), using the determined misalignment to provide the feedback error signal.

40. The method of claim 39, wherein any misalignment in the probe beam pitch is detected by a horizontal shift in the alternating intensity centroid shift between the holographic images of the sampled one or more even numbered and odd numbered holograms, and any misalignment in the probe beam wavelength is detected by a vertical shift in the alternating intensity centroid shift between the holographic images of the sampled one or more even numbered and odd numbered holograms.

41. The method of claim 34, wherein the at least one alignment control axis is hologram shift position and wherein the feedback error signal of step (b) is derived by the following steps: (i) imparting an alternating x-dimensional spatial position wobble offset to recovery positions of one or more holograms; (ii), after step (i), using alignment-indicating data from sampling the one or more recovered holograms to determine any misalignment in hologram shift positions; and (iii) for any misalignment determined in step (ii), using the determined misalignment to provide the feedback error signal for correcting the hologram shift position.

42. The method of claim 34, wherein the at least one alignment control axis is hologram exposure timing and wherein the feedback error signal of step (b) is derived by the following steps: (i) imparting an alternating timing wobble offset to a sampling interval for a holographic storage medium having the sequence recorded thereon and which is shifting at a constant velocity and; (ii), after step (i), using alignment-indicating data from sampling the one or more recovered holograms to determine any misalignment in hologram exposure timing; and (iii) for any misalignment determined in step (ii), using the determined misalignment to provide the feedback error signal to correct the hologram exposure timing.

43. The method of claim 34, wherein the at least one alignment control axis is wavelength tuning and wherein the feedback error signal of step (b) is derived by the following steps: (i) imparting an alternating wavelength wobble offset to the wavelength of one or more probe beams used to recover the one or more holograms; (ii), after step (i), using alignment indicating data from sampling the one or more recovered holograms to determine any misalignment in the wavelength tuning; and (iii) for any misalignment determined in step (ii), using the determined misalignment to provide the feedback error signal to correct the wavelength tuning.

44. The method of claim 34, wherein the feedback error signal of step (b) is derived by the following steps: (i) imparting wobble to one or more holograms to provide two holographic images having an intensity pattern shift; (ii), after step (i), performing a cross-correlation operation between: (1) the two holographic images; or (2) intensity maps of the two holographic images to provide a cross-correlation peak; (iii) from the cross-correlation operation performed in step (ii), determining the optimum location of the cross-correlation peak; and (iv) using the determined optimum cross-correlation peak to provide the feedback error signal.

45. The method of claim 44, wherein the optimum location of the cross-correlation peak location is determined during step (iii) by detecting the x,y-centroid of the cross-correlation operation of step (ii).

46. The method of claim 45, wherein the cross-correlation operation of step (ii) is performed by calculating dot products of the D.C.-free versions of the image intensity maps of the two holographic images to provide a modified cross-correlation matrix, and wherein the optimum location of the cross-correlation peak is determined during step (iii) by using the modified cross-correlation matrix, wherein the modified cross-correlation matrix comprises a 3×3 modified cross-correlation matrix having one center matrix element and eight outer matrix elements, and wherein a value for the center matrix element is not calculated, and wherein values for each of the eight outer matrix elements are calculated.

47. The method of claim 34, wherein the feed-forward signal of step (c) is derived from recording and recovery operating condition data which comprises temperature differences between the recording and recovery of the holograms.

48. The method of claim 47, wherein the temperature differences between the recording and recovery of the holograms is determined by the following steps: (i) measuring the temperatures during recovery for each recovered hologram; and (ii) subtracting a predetermined pre-compensation recording temperature for each recovered hologram.

49. The method of claim 34, wherein step (d) comprises inputting the derived feedback error signal of step (b) and the derived feed-forward signal of step (c) to a control system compensation algorithm to provide one or more control axis commands for adjusting the at least one alignment control axis.

50. The method of claim 49, wherein the one or more control axis commands are generated by a control processor.

51. A method comprising the following steps:
(a) in a holographic data storage system or device, providing a hologram to be recovered; and
(b) adjusting at least one alignment control axis of the holographic data storage system or device to or towards a sufficiently optimal recovery position for recovery of the hologram by the holographic data storage system or device based on a feedback error signal for the hologram; wherein the feedback error signal for the hologram is derived by an iterative alignment procedure comprising: (i) providing at least one alignment control axis having a starting position; (ii) providing alignment-indicating data for the at least one alignment control axis by imparting one or more wobbles to provide the alignment-indicating data; (iii) determining from the alignment indicating data an alignment value for the at least one alignment control axis; and (iv) based on the alignment value determined in step (iii), determining whether to adjust the at least one alignment control axis from the initial starting position to a new position and repeating steps (ii) through (iii), or whether the at least at least one control axis is at the sufficiently optimal recovery position, thereby terminating the iterative alignment procedure.

52. The method of claim 51, wherein the at least one alignment control axis includes at least one probe beam alignment control axis.

53. The method of claim 51, wherein the at least one probe beam alignment control axis is selected from one or more of a probe beam angle, a probe beam wavelength, and a probe beam pitch.

54. The method of claim 51, wherein the one or more wobbles are imparted during step (ii) to the at least one alignment control axis.

55. The method of claim 51, wherein the one or more wobbles are imparted during step (ii) to an alignment control axis which is different from the at least one alignment control axis.

56. The method of claim 51, wherein the at least one probe beam alignment control axis includes at least the probe beam angle, and wherein the alignment value for the probe beam angle ($err_\phi$) is determined in step (iii) by the equation $err_\phi = k_\phi (SNR2-SNR1)$, wherein $k_\phi$ is a scaling constant and SNR1 and SNR2 are signal-to-noise ratios measured from first and second holographic image exposures, respectively.

57. The method of claim 51, wherein the at least one probe beam alignment control axis includes at least the probe beam pitch, and wherein the alignment error value for the probe beam pitch ($err_p$) is determined in step (iii) by the equation err $P = k_p (CY2-CY1)$, wherein $k_p$ is a scaling constant, and CY1 and CY2 are intensity centroids in the y (horizontal) dimension determined from first and second holographic image exposures, respectively.

58. The method of claim 51, wherein the at least one probe beam alignment control axis includes at least the probe beam wavelength, and wherein the alignment value for the probe beam wavelength ($err_\lambda$) is determined in step (iii) by the equation $err_\lambda = k_\lambda (CX2-CX1)$, where $k_\lambda$ is a scaling constant, and CX1 and CX2 are intensity centroids in the x (vertical) direction determined from first and second holographic image exposures, respectively.

59. The method of claim 51, wherein the at least one probe beam alignment control axis comprises a probe beam angle, a probe beam wavelength, and a probe beam pitch.

60. The method of claim 51, wherein the alignment value in step (iii) is determined from alignment-indicating data from image intensities of first and second holographic image exposures.

61. The method of claim 51, wherein step (iii) is carried out using a cross-correlation operation to determine the alignment value.

62. The method of claim 61, wherein the cross-correlation operation of step (iii) comprises calculating dot products of D.C.-free versions of image intensity maps of two holographic images to provide a cross-correlation matrix.

63. The method of claim 62, wherein the cross-correlation matrix is a modified cross-correlation matrix, wherein the modified cross-correlation matrix comprises a 3×3 modified cross-correlation matrix having one center matrix element and eight outer matrix elements, and wherein a value for the center matrix element is not calculated, and wherein values for each of the eight outer matrix elements are calculated.

64. The method of claim 51, wherein the alignment value in step (iii) is determined by averaging alignment values from multiple error samples.

65. The method of claim 51, wherein step (iv) IS carried out by repeating steps (ii) through (iii) a predetermined number of times.

66. The method of claim 51, wherein step (iv) is carried out by repeating steps (ii) through (iii) until the alignment value is equal to or less than a predetermined threshold alignment error criteria.

* * * * *